(12) United States Patent
Yoshii et al.

(10) Patent No.: US 8,370,578 B2
(45) Date of Patent: Feb. 5, 2013

(54) STORAGE CONTROLLER AND METHOD OF CONTROLLING STORAGE CONTROLLER

(75) Inventors: Yoshihiro Yoshii, Odawara (JP); Mitsuru Inoue, Hiratsuka (JP); Kentaro Shimada, Tokyo (JP); Sadahiro Sugimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 13/119,292

(22) PCT Filed: Mar. 3, 2011

(86) PCT No.: PCT/JP2011/001248
§ 371 (c)(1),
(2), (4) Date: Mar. 16, 2011

(87) PCT Pub. No.: WO2012/117451
PCT Pub. Date: Sep. 7, 2012

(65) Prior Publication Data
US 2012/0226861 A1    Sep. 6, 2012

(51) Int. Cl.
*G06F 12/00* (2006.01)
(52) U.S. Cl. ......... 711/118; 711/E12.052; 711/E12.055; 711/E12.062; 711/E12.041
(58) Field of Classification Search .................. 711/118, 711/E12.052, E12.055, E12.062, E12.041
See application file for complete search history.

(56) References Cited

U.S. PATENT DOCUMENTS

| | | | |
|---|---|---|---|
| 5,802,559 A * | 9/1998 | Bailey | 711/118 |
| 6,332,176 B1 * | 12/2001 | Fang et al. | 711/113 |
| 6,988,167 B2 * | 1/2006 | Allen et al. | 711/128 |
| 7,533,213 B2 * | 5/2009 | Jeddeloh | 711/5 |
| 7,856,633 B1 * | 12/2010 | Lee et al. | 718/105 |
| 8,195,891 B2 * | 6/2012 | Trika | 711/144 |
| 2004/0210717 A1 | 10/2004 | Tanaka et al. | |
| 2010/0125704 A1 | 5/2010 | Kanai | |

FOREIGN PATENT DOCUMENTS

JP    2010-122730 A    6/2010

OTHER PUBLICATIONS

Uwe Scheffel, "PCI and PCI-X: The Parallel Buses", Nov. 23, 2005, pp. 1-4, http://www.tomshardware.com/reviews/pc-interfaces-101,1177-18.html.* West World Productions, "PCI Express: Connectivity for the Next Generation", 2006, pp. 1-5, http://www.thefreelibrary.com/PCI+Express%3a+connectivity+for+the+next+generation-a0144388109.*
PCT International Search Report and Written Opinion on application No. PCT/JP2011/001248 mailed Jun. 14, 2011; 9 pages.

* cited by examiner

*Primary Examiner* — Edward Dudek, Jr.
*Assistant Examiner* — Christopher Birkhimer
(74) *Attorney, Agent, or Firm* — Foley & Lardner LLP

(57) ABSTRACT

Provided is a storage controller and method of controlling same which, if part of a storage area of a local memory is used as cache memory, enable an access conflict for access to a parallel bus connected to the local memory to be avoided.
A storage controller which exercises control of data between a host system and a storage apparatus, comprising a data transfer control unit which exercises control to transfer the data on the basis of a read/write request from the host system; a cache memory which is connected to the data transfer control unit via a parallel bus; a control unit which is connected to the data transfer control unit via a serial bus; and a local memory which is connected to the control unit via a parallel bus, wherein the control unit decides to assign, from a cache segment of either the cache memory or the local memory, a storage area which stores the data on the basis of a CPU operating rate and a path utilization of the parallel bus connected to the cache memory.

10 Claims, 22 Drawing Sheets

FIG. 16

| DEVICE | ACCESS PATH PRESENT/NOT PRESENT | CONNECTED HOST INFORMATION | CAPACITY |
|---|---|---|---|
| | | | |
| | | | |

1E, 2E, 3E, 4E — 1310E

F I G . 17
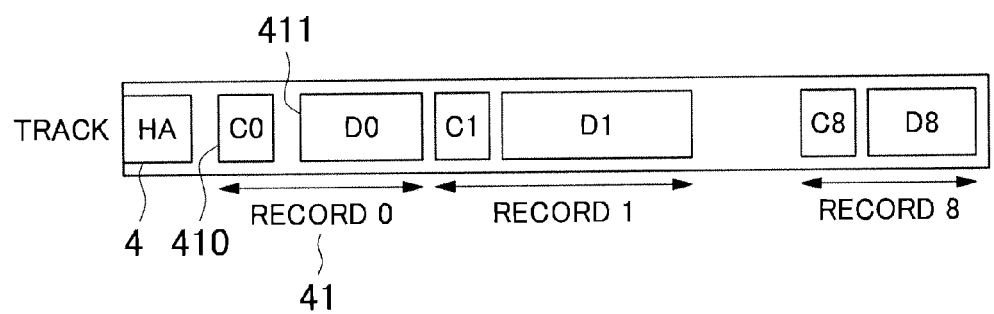

US 8,370,578 B2

STORAGE CONTROLLER AND METHOD OF CONTROLLING STORAGE CONTROLLER

TECHNICAL FIELD

The present invention relates to a storage controller and a method of controlling the storage controller and, more particularly, is suitably applied to a storage controller comprising memory of two types with different characteristics such as cache memory and local memory, and to a method of controlling same.

BACKGROUND ART

Conventionally, a storage controller, which is connected between a host system, such as a host computer, and a storage apparatus such as a hard disk drive and which controls data I/O between the host system and storage apparatus, is known.

Upon receiving a read/write request from the host system, the storage controller temporarily stores read/write target data (hereinbelow called 'user data') in the memory based on the received read/write request. In addition, the storage controller also stores 'control information' for controlling operations in the apparatus/system.

The memory which the storage controller comprises typically uses both an involatile memory such as flash memory, which is capable of retaining data even when the power source of the storage controller is cut and volatile memory such as DRAM (Dynamic Random Access Memory), which is not capable of retaining data when the power source of the storage controller is cut. Furthermore, typically, the involatile memory is used as cache memory and the volatile memory is used as local memory. Furthermore, each of the parts in the cache memory and local memory and the storage controller are connected by parallel buses.

As mentioned above, one of the parallel buses is connected to a cache memory and local memory, while the other parallel bus is connected to a data transfer control unit such as an LSI (Large Scale Integration) or ASIC (Application Specific Integrated Circuit) and to a central processing unit such as CPU (Central Processing Unit). Furthermore, the data transfer control unit and central processing unit input user data and control information and so on via a parallel bus.

Here, since a transfer system such as a parallel bus is a system which transfers data in parallel, the connector requires a plurality of pins. Hence, if the data transfer speed is to be improved by increasing the memory bandwidth, a large number of pins are required and there is then the problem of the costs involved in preparing the applicable LSI or ASIC and CPU and the like.

Therefore, PTL1 discloses a technology according to which, when part of the data to be stored in the cache memory is stored in the local memory, part of the local memory storage area is used as cache memory. Technology for using the local memory as involatile memory by means of a battery backup (BBU: Battery Back Up) function is also disclosed.

By using part of the local memory storage area as cache memory, the memory bandwidth which can be used as cache memory can be increased and the data transfer speed can be improved. Furthermore, the local memory is, as mentioned above, typically a volatile memory and is incapable of retaining data when the power source is cut, however, by rendering the local memory involatile memory using the BBU function, the reliability of the data stored in the local memory can be ensured.

CITATION LIST

Patent Literature

PTL 1: Japanese Published Unexamined Application No. 2010-122730

SUMMARY OF INVENTION

Technical Problem

However, although PTL 1 mentions using part of the local memory storage area as cache memory, PTL1 does not disclose how to use the data storage destination as cache memory or local memory. Therefore, using the technology disclosed in PTL1 alone creates, as will be explained subsequently, an access path conflict problem.

Here, 'access path conflict' refers to a conflict in the parallel bus which connects the local memory and the central processing unit. The local memory is primarily used as a working memory for storing control information and the central processing unit performs centralized control of system operations on the basis of the control information stored in the local memory, however, as disclosed in PTL1, when user data which is to be stored in cache memory is stored in the local memory, the timing with which the central processing unit accesses the control information stored in the local memory and the timing with which the data transfer control unit accesses the user data stored in the local memory may be the same timing. Here, the parallel bus connecting the local memory and central processing unit is subject to two conflicting accesses.

Thus, if there is an access conflict when the same parallel bus is accessed, this produces problems including an increased load on the local memory, an extended delay time (latency), and reduced throughput, and the like. Hence, if part of the local memory storage area is used as the cache memory, user data must be stored in the local memory on the basis of suitable conditions in order to avoid any access path conflicts.

The present invention was devised in view of the aforementioned problem, and seeks to propose a storage controller and method of controlling same which, if part of a storage area of a local memory is used as cache memory, enable an access path conflict to be avoided in a parallel bus connecting the local memory and central processing unit.

Solution to Problem

In order to solve this problem, the present invention provides a storage controller which exercises control of data between a host system and a storage apparatus, the storage controller comprising a data transfer control unit which exercises control to transfer the data on the basis of a read/write request from the host system; a cache memory which is connected to the data transfer control unit via a first parallel bus and which stores the data transferred from the data transfer control unit; a control unit which is connected to the data transfer control unit via a serial bus and which instructs the data transfer control unit to perform a transfer control operation; and a local memory which is connected to the control unit via a second parallel bus and which stores the data transferred from the data transfer control unit via the control unit, wherein the control unit executes cache segment selection processing in which the control unit decides to assign, from a cache segment of either the cache memory or the local memory, a storage area which stores the data on the basis of an operating rate of the control unit and a path utilization of the first parallel bus.

Furthermore, the present invention provides a method of controlling a storage controller which exercises control of data between a host system and a storage apparatus, the storage controller comprising a data transfer control unit which exercises control to transfer the data on the basis of a read/write request from the host system; a cache memory which is connected to the data transfer control unit via a first parallel bus and which stores the data transferred from the data transfer control unit; a control unit which is connected to the data transfer control unit via a serial bus and which instructs the data transfer control unit to perform a transfer control operation; and a local memory which is connected to the control unit via a second parallel bus and which stores the data transferred from the data transfer control unit via the control unit, the method comprising a first step in which the control unit executes cache segment selection processing in which the control unit decides to assign, from a cache segment of either the cache memory or the local memory, a storage area which stores the data on the basis of an operating rate of the control unit and a path utilization of the first parallel bus; and a second step in which the control unit stores the data in the cache segment determined in the first step.

Advantageous Effects of Invention

The present invention makes it possible to avoid access path conflicts in a parallel bus connecting a local memory and central processing unit in cases where part of the local memory storage area is used as cache memory.

BRIEF DESCRIPTION OF DRAWINGS

FIG. 16 is a conceptual view schematically showing a device configuration management table.

FIG. 17 is a conceptual view showing a mainframe data structure.

DESCRIPTION OF EMBODIMENTS

An embodiment of the present invention is described in detail hereinbelow with reference to the drawings.

(1) First embodiment
(1-1) Configuration of Storage Controller

Figure 1:
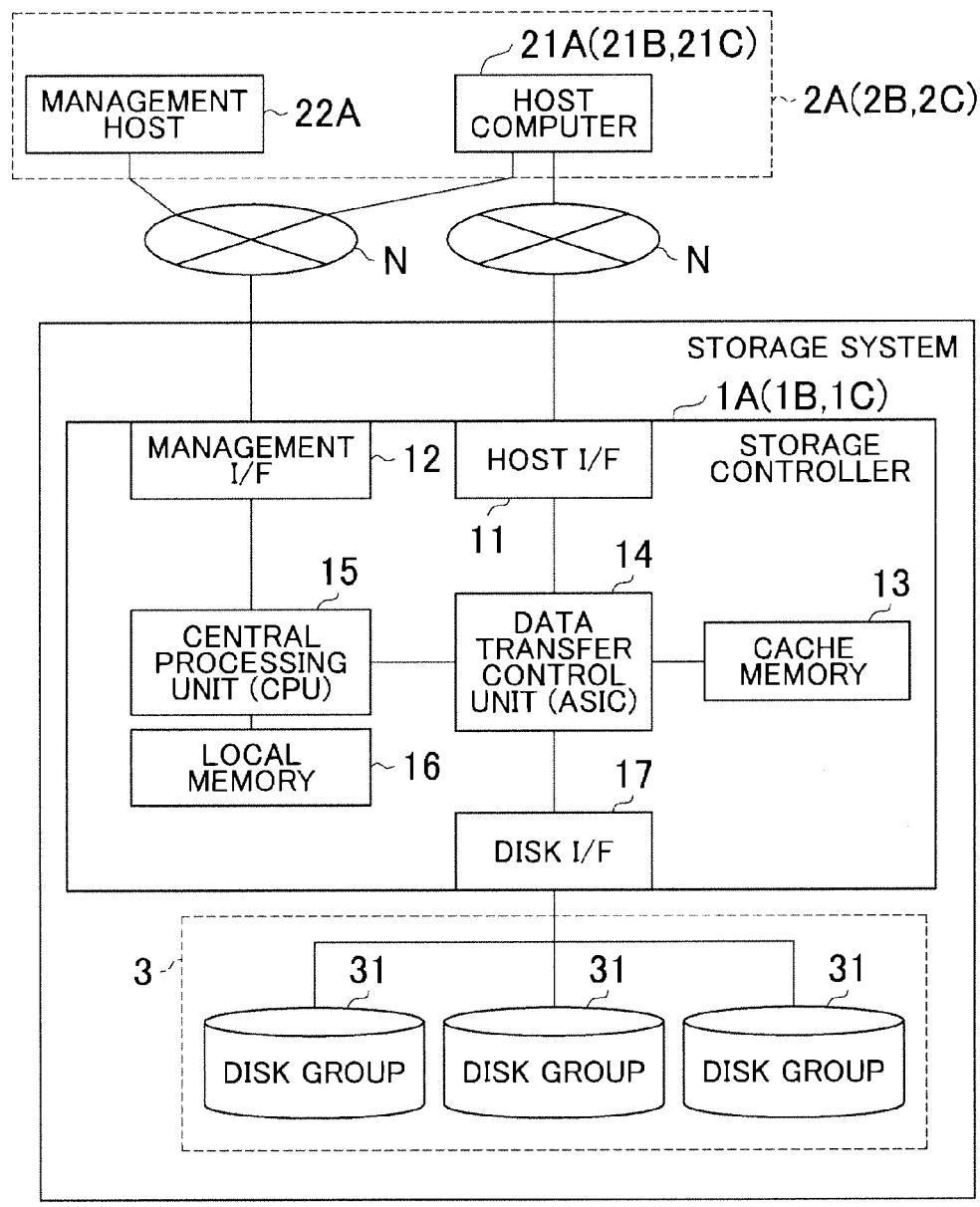
FIG. 1 is a diagram showing the overall configuration of a storage controller.

FIG. 1 shows the overall configuration of a storage controller 1A and the storage controller 1A is shown connected between the host system 2A and a storage apparatus 3. Note that, generally, a system which comprises a storage controller 1A and the storage apparatus 3 is called the 'storage system.'

Furthermore, the storage controller 1A is configured comprising a host I/F 11, a management I/F 12, a cache memory 13, a data transfer control unit 14, a central processing unit 15, a local memory 16, and a disk I/F 17.

The host I/F 11 is connected to a host computer 21A via a network N while also being connected to the data transfer control unit 14 via an internal bus. Furthermore, if various data is received from the host computer 21A, the host I/F 11 outputs the various data received to the data transfer control unit 14. In addition, if various data from the data transfer control unit 14 is input to the host I/F 11, the host I/F 11 transmits the various data thus input to the host computer 21A.

The management I/F 12 is connected to a management host 22A via the network N while also being connected to the central processing unit 15 via an internal bus. Furthermore, if various data is received from the management host 22A, the management I/F 12 outputs the various data received to the central processing unit 15. In addition, if various data is input from the central processing unit 15, the management I/F 12 transmits the various data thus input to the management host 22A.

The cache memory 13 is an involatile memory which is capable of retaining data even when the power source of the storage controller 1A is cut and is, for example, a battery backup-type memory which maintains involatility by backing up a flash memory, magnetic disk memory or volatile memory with a power source, for example. The cache memory 13 is connected to the data transfer control unit 14 via an internal bus and performs data I/O with the data transfer controller 14. Note that, as data which is stored by the cache memory 13, there exists control information which is used to control user data stored in the storage apparatus 3 and to control the operation in the storage controller 1A (see FIG. 4).

The data transfer control unit 14 is an LSI (Large Scale Integration) and ASIC (Application Specific Integrated Circuit) or the like, for example, is connected to each of the parts, namely, the host I/F 11, the cache memory 13, the central processing unit 15, and the disk I/F 17 via an internal bus, and controls the data I/O between each of these parts.

The central processing unit 15 is connected, via an internal bus, to the management I/F 12, the data transfer control unit 14, and the local memory 16, and centrally controls the operation of the storage controller 1A on the basis of various programs and various information stored in the local memory 16.

The local memory 16 is a volatile memory which is incapable of holding data when the power source of the storage controller 1A is cut and is DRAM (Dynamic Random Access Memory), for example. The local memory 16 is connected to the central processing unit 15 via an internal bus and performs data I/O to and from the central processing unit 15. Note that the local memory 16 stores various program and various information for controlling operation of the storage controller 1A but, in this embodiment, also stores part of the control information which is stored in the cache memory 13 (see FIG. 3).

The disk I/F 17 is connected to the plurality of the disk groups 31 via a bus or the like while also being connected to the data transfer control unit 14 via an internal bus. Furthermore, if data from the disk group 31 is received, the disk I/F 17 outputs the received data to the data transfer control unit 14. In addition, if various data from the data transfer control unit 14 is input, the disk I/F 17 transmits the various data thus input to the disk group 31.

Further, the host system 2A is configured from the host computer 21A and the management host 22A, and the host computer 21A and management host 22A are configured comprising hardware resources such as a central processing unit, memory, network interface and local I/O device, which are not shown, and software resources such as an operating system (OS) and application programs. The host system 2A issues data read/write requests to the storage apparatus 3 via a network N and a storage controller 1A, for example. Note that, typically, in order to distinguish between usage by a user and a system administrator, here the host system 2A comprises the host computer 21A and the management host 22A but the host computer 21A and management host 22A may also be configured by the same system.

In addition, the storage apparatus 3 is configured by a plurality of disk groups 31 and the plurality of disk groups 31 are configured, for example, from semiconductor memory such as SSD (Solid State Drive), SAS (Serial Attached SCSI) disks, or FC (Fibre Channel) disks or SATA (Serial AT Attachment) disks and so on. The storage apparatus 3 receives read/write requests from the host system 2A via the storage controller 1A and executes processing corresponding to the received read/write requests on the basis of control of the storage controller 1A.

(1-2) Bus Configuration

Figure 2:
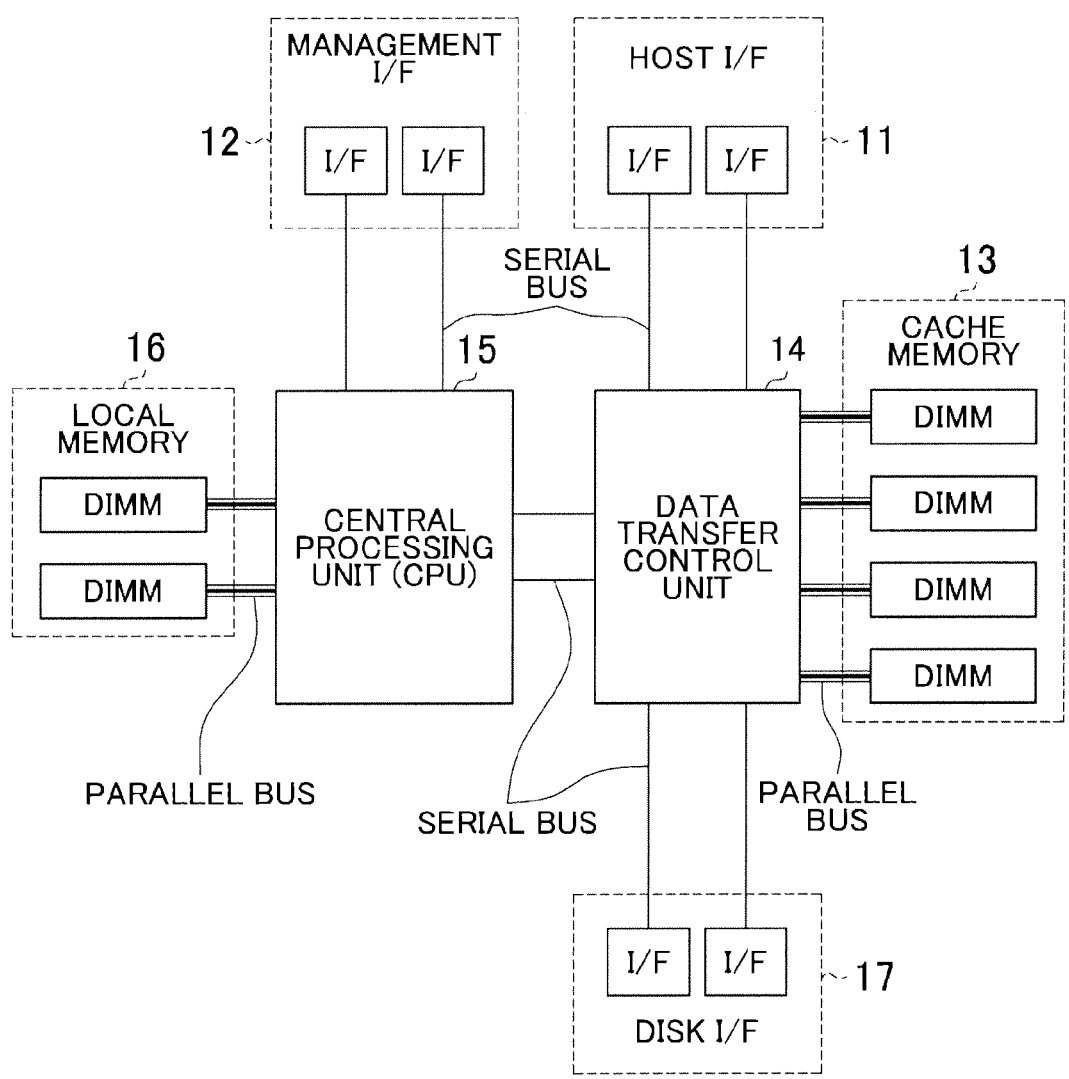
FIG. 2 is a diagram showing the configuration of the bus in the storage controller.

FIG. 2 shows a configuration of internal buses connecting each of the parts (11 to 17) in the storage controller 1A, among which a parallel bus is used for the connection between the cache memory 13 and the local memory 16, while a serial bus is used for the other connections.

In recent years, due to the introduction of serial buses capable of high-speed transfer (PCI-Express, for example), the usage of serial buses as internal buses has gone mainstream. Serial buses are capable of connecting each of the parts with a minimal number of pins and hence afford the benefit of enabling an efficient increase in memory bandwidth in comparison with parallel buses.

However, as the bus which is used to connect the cache memory 13 and local memory 16, parallel buses naturally predominate. Parallel buses require a greater number of pins to increase the bandwidth and suffer the drawback of the costs to prepare the LSI or ASIC and CPU involved. Although there will probably be a move toward serializing the connection between the cache memory 13 and local memory, it has not yet come to fruition.

(1-3) Logical Configuration of Local Memory

Figure 3:
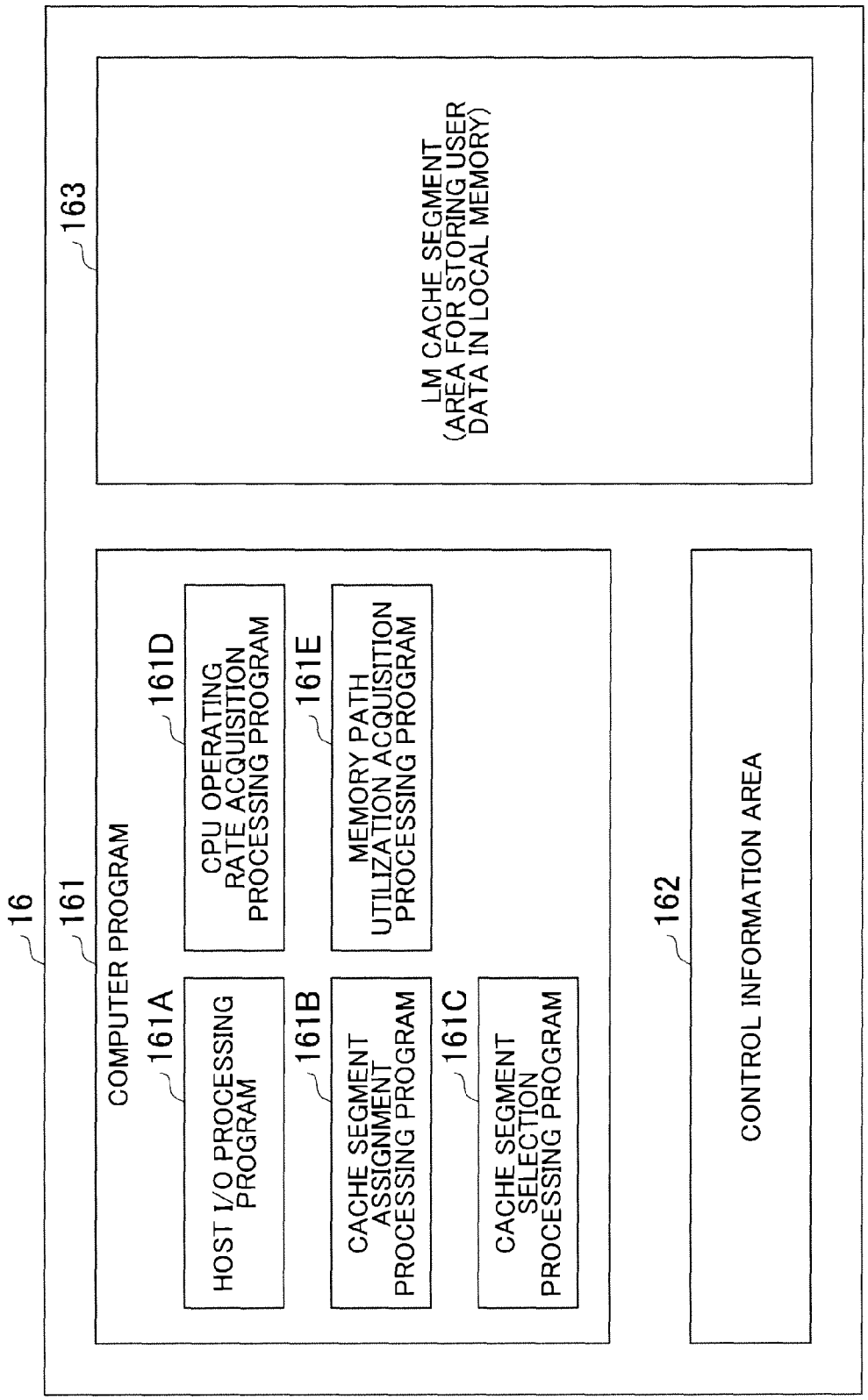
FIG. 3 is a diagram showing the logical configuration of local memory.

FIG. 3 shows the logical configuration of the local memory 16 and the local memory 16 is configured from a computer program 161, a control information area 162, and a LM (Local Memory) cache segment 163.

The computer program 161 is configured from a host I/O processing program 161A, a cache segment assignment processing program 161B, a cache segment selection processing program 161C, a CPU operating rate acquisition processing program 161D, and a memory path utilization acquisition processing program 161E.

These various programs are read by the central processing unit 15 and are used to control the operation of the storage controller 1A in co-operation with the central processing unit 15. Note that the host I/O processing program 161A is a program which is used when performing data read/write processing to and from the host system 2A (see FIGS. 10 and 11), the cache segment assignment processing program 161B is a program (see FIG. 12) which is used when assigning a cache segment to the memory (13 or 16), and the cache segment selection processing program 161C is a program (see FIG. 13) which is used when selecting memory (13 or 16) to which the cache segment is assigned. Note that 'segment' refers to a unit of division when the storage area of the memory (13 or 16) is logically divided according to a certain optional size. The specific processing details of the programs (161A to 161C) will be provided subsequently (FIGS. 10 to 13).

In addition, the CPU operating rate acquisition processing program 161D is a program which is used when acquiring the operating rate of the central processing unit 15 and the operating rate of the central processing unit 15 is calculated according to the following equation, for example.

(Math. 1)

$$\begin{aligned}&(\text{CPU operating rate}) = (\text{the number of clocks in the} \\ &\quad\text{period while the storage controller } \mathbf{1A} \text{ is per-} \\ &\quad\text{forming processing})/(\text{the number of clocks} \\ &\quad\text{elapsed since measurement in the storage con-} \\ &\quad\text{troller } \mathbf{1A} \text{ is started})*100\ [\%]\end{aligned} \quad (1)$$

Note that an CPU operating rate during normal operation of about 50% is assumed and a state where the CPU operating rate rises up to around 80% is typically a high load.

Furthermore, the memory path utilization acquisition processing program 161E is a program which is used to acquire the memory path utilization managed by the data transfer control unit 14 and the memory path utilization is calculated as per the following equation, for example.

(Math. 2)

$$\begin{aligned}&(\text{Memory path utilization}) = (\text{the number of clocks in} \\ &\quad\text{the period during which the data transfer control} \\ &\quad\text{unit } \mathbf{14} \text{ performs transfers using a parallel bus to} \\ &\quad\text{and from the cache memory } \mathbf{13})/(\text{the number of} \\ &\quad\text{clocks elapsed since measurement in the storage} \\ &\quad\text{controller } \mathbf{1A} \text{ is started})*100\ [\%]\end{aligned} \quad (2)$$

The control information area 162 is an area for storing part of the control information (see FIG. 4) stored in the cache memory 13. Normally, if the central processing unit 15 acquires control information, the central processing unit 15 accesses the cache memory 13, and this requires a read time (access latency). Accordingly, in this embodiment, part of the control information stored in the cache memory 13 is stored in the local memory 16 in order to shorten the access latency to the control information. Note that the control information stored in the cache memory 13 will be described subsequently (see FIG. 4).

In addition, the LM cache segment 163 is a storage area which temporarily stores write target data or read target data (hereinafter called 'user data') which is to be stored in the cache memory 13. Normally, if there is a read/write request from the host system 2A, the central processing unit 15 accesses the user data which is stored in the cache memory 13 according to the read/write request, but this requires access latency. Accordingly, in this embodiment, the access latency for access to the user data is shortened by storing the user data in the LM cache segment 163 only if predetermined conditions are fulfilled.

(1-4) Logical Configuration of Cache Memory

Figure 4:
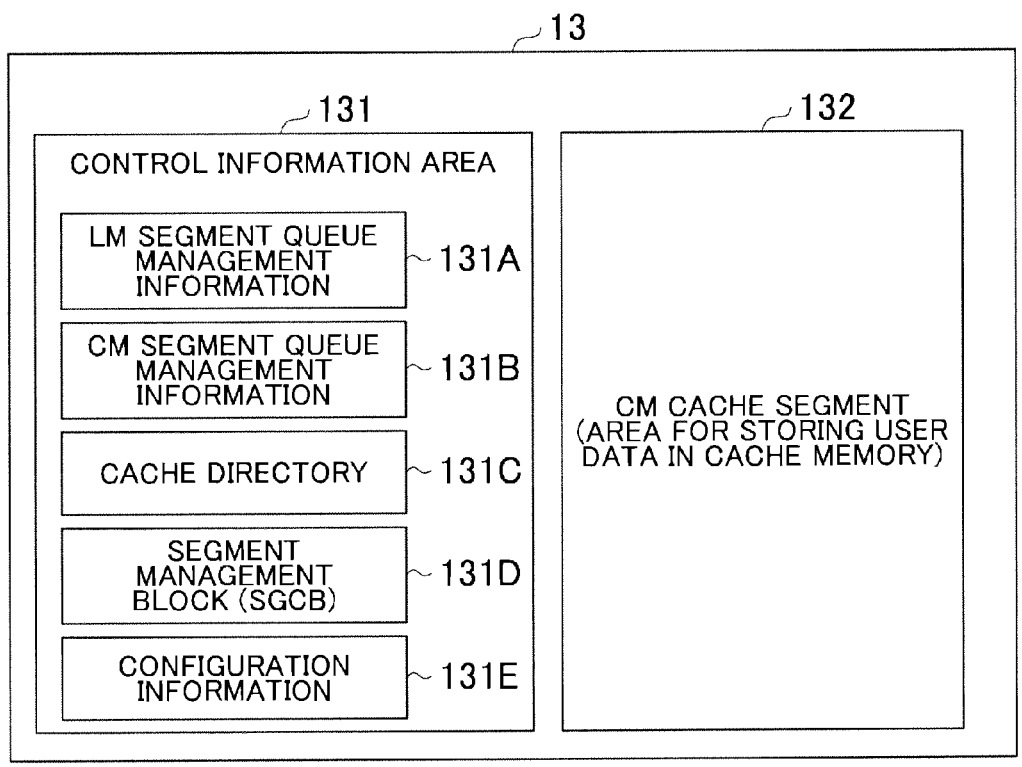
FIG. 4 is a diagram showing the logical configuration of cache memory.

FIG. 4 shows the logical configuration of the cache memory 13 and the cache memory 13 is configured from a control information area 131 and a CM (Cache Memory) cache segment 132.

The control information area 131 is an area for storing a plurality of control information and, more specifically, is an area for storing LM (Local Memory) segment queue management information 131A, CM (Cache Memory) segment queue management information 131B, a cache directory 131C, a segment management block 131D, and configuration information 131E. Note that, in the following description or drawings, 'segment management block' will sometimes appear abbreviated as 'SGCB (SeGment Control Block).'

The LM segment queue management information 131A is information for managing, using an MRU (Most Recently Used) pointer and an LRU (Least Recently Used) pointer, a queue for the segment management block 131D which is prepared for each segment in the local memory 16 and is pointer information pointing to position information for a single segment management block among the plurality of segment management blocks 131D in the local memory 16.

In addition, the CM segment queue management information 131B is information for managing, using the MRU pointer and LRU pointer, a queue for the segment management block 131D which is prepared for each of the segments in the cache memory 13 and is pointer information pointing to position information for a single segment management block among the plurality of segment management blocks 131D in the cache segment 13.

Figure 6:
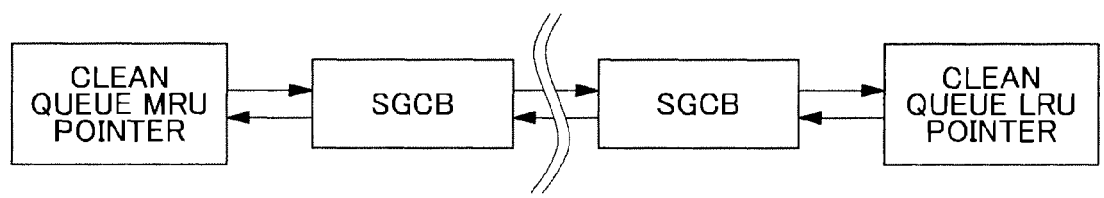
FIG. 6 is a conceptual view of a queue management structure.
Figure 7:
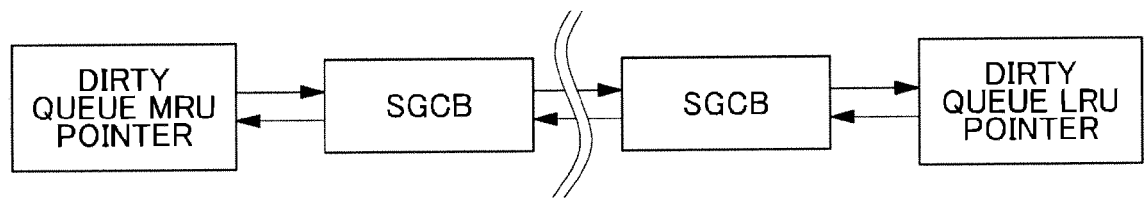
FIG. 7 is a conceptual view of a queue management structure.
Figure 8:
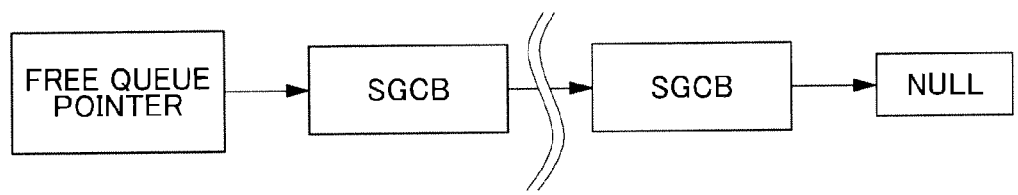
FIG. 8 is a conceptual view of a queue management structure.

Details on the foregoing LM segment queue management information 131A and CM segment queue management information 131B will be provided next (see FIGS. 6 to 8).

Figure 9:
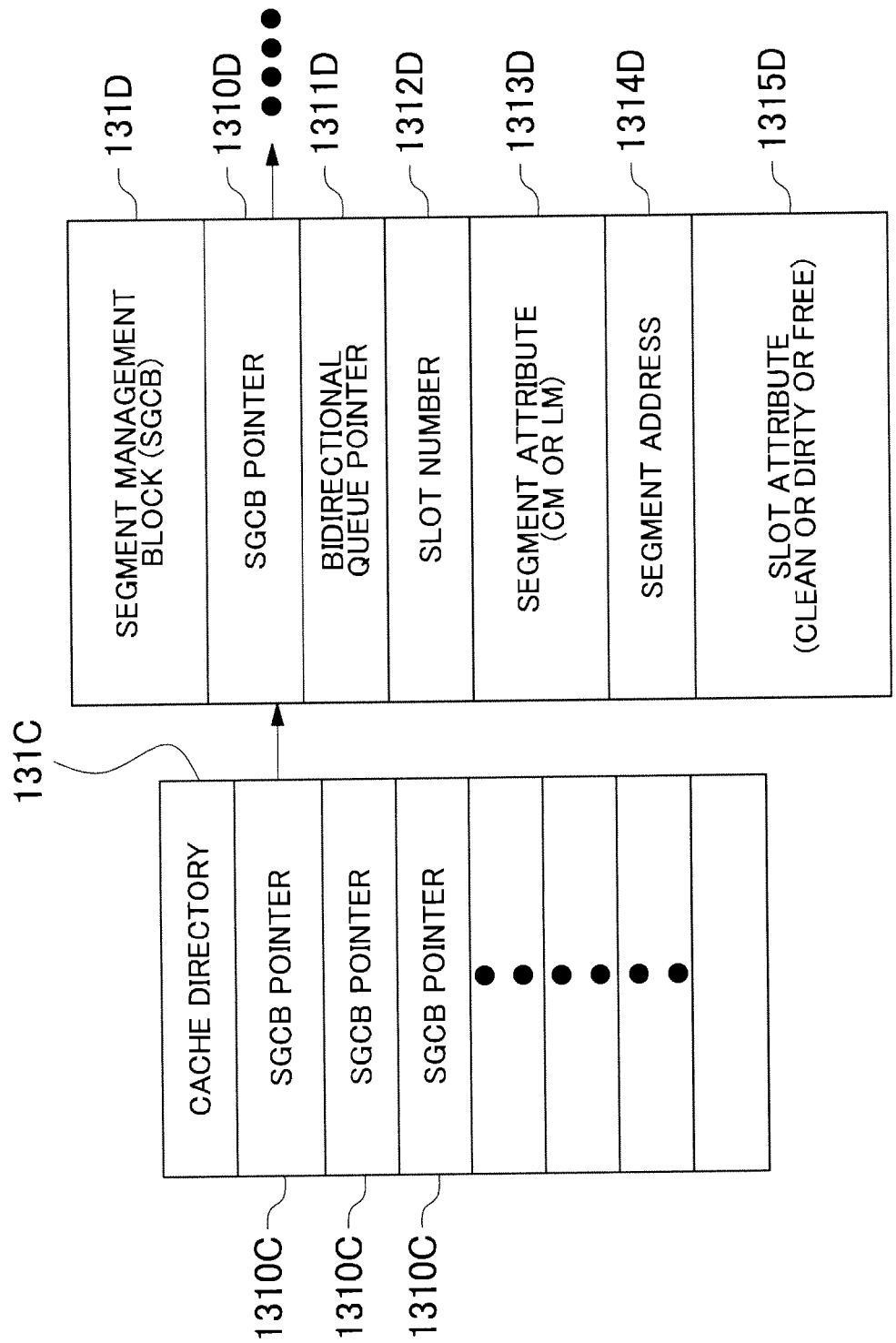
FIG. 9 is a diagram showing the logical configuration of a cache directory and segment management block.

Furthermore, the cache directory 131C is a hash table which is configured from a plurality of segment management block pointers and each of the plurality of segment management block pointers is information pointing to positional information of a single segment management block 131D (see FIG. 9).

The segment management block 131D is management information pertaining on a one for one basis to the plurality of segments in the cache memory 13 and is prepared in a volume corresponding to the number of segments which the cache memory 13 comprises. Each of the segment management blocks 131D is configured from a segment management block pointer or bidirectional queue pointer, or the like, which points to another segment management block 131D.

Details on the foregoing cache directory 131C and segment management block 131D will be provided subsequently (see FIG. 9).

The configuration information 131E is control information and type information for the logical volume storing the user data. The logical volume configuration information contains, for example, positional information for the disk groups 31 in the storage apparatus 3 and assignment information on which host system 2A the logical volume provided by the disk group 31 is assigned to, and so on. Further, the type information contains, for example, the type of this logical volume as well as information on whether this is an open system or mainframe. Note that part of the configuration information 131E is stored in the control information area 162 of the local memory 16.

The CM cache segment 132 is a storage area which temporarily stores user data from the host system 2A or storage apparatus 3.

(1-5) Logical Configuration of Data Transfer Control Unit

Figure 5:
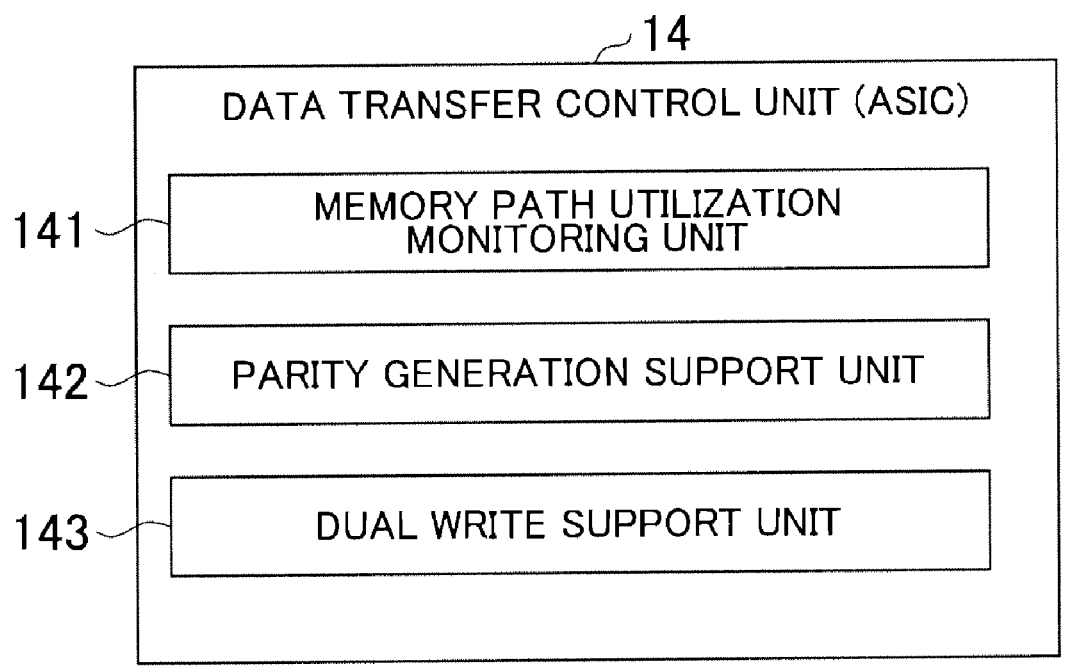
FIG. 5 is a diagram showing the logical configuration of a data transfer control unit.

FIG. 5 shows the logical configuration of the data transfer control unit 14 and the data transfer control unit 14 is configured from a memory path utilization monitoring unit 141, a parity generation support unit 142 and a dual write support unit 143.

The memory path utilization monitoring unit 141 monitors the utilization of the parallel bus connecting the data transfer control unit 14 to the cache memory 13. More specifically, the memory path utilization monitoring unit 141 measures the transfer time (busy time and total time) and calculates the memory path utilization on the basis of the transfer time.

In addition, the parity generation support unit 142 generates parity from user data stored in the storage apparatus 3 and stores the generated parity in the disk group 31 of the storage apparatus 3.

Furthermore, the dual write support unit 143, in cases where user data and control information are written to the cache memory 13, writes the user data and control information in two places in the storage area in the cache memory 13.

(1-6) Queue Structure

FIGS. 6 to 8 show a queue management structure for managing a segment management block (SGCB) queue by means of the LM segment queue management information 131A or CM segment queue management information 131B (hereinafter called 'queue management information'). This queue management structure is a structure in which a pointer which is contained in the queue management information points to a single SGCB and the pointer contained in the SGCB which is indicated points to another SGCB.

FIG. 6 shows a queue management structure for a case where the queue management information is a clean queue MRU pointer and a clean queue LRU pointer. The clean queue MRU pointer is a pointer which points to the most recently used SGCB and the clean queue LRU pointer is a pointer which points to the least used SGCB. The data managed by the SGCB indicated by the clean queue MRU/LRU pointer is data which is already stored in the storage apparatus 3 and data for which even the deletion of data from the cache memory 13 or local memory 16 is not fatal. This data is called 'clean data.' Furthermore, when the clean data is used (accessed), the SGCB pointing to the clean data thus accessed is inserted between the clean queue MRU pointer and the SGCB related to the clean queue MRU pointer.

FIG. 7 shows a queue management structure in a case where the queue management information is a dirty queue MRU pointer and dirty queue LRU pointer. A dirty queue MRU pointer is a pointer which points to the most recently used SGCB and a dirty queue LRU pointer is a pointer which points to the least used SGCB. The data managed by the SGCB indicated by the dirty queue MRU/LRU pointer is not yet stored in the storage apparatus 3 and is data stored only in the cache memory 13 or local memory 16, and hence the data from the memory (13 or 16) is data for which deletion is fatal.

Such data is called 'dirty data.' Further, when this dirty data is accessed, the SGCB indicating the accessed dirty data is inserted between the dirty queue MRU pointer and the SGCB related to the dirty queue MRU pointer.

FIG. 8 shows a queue management structure for a case where the queue management information is a free queue pointer. The free queue pointer is a pointer which indicates an SGCB to which a managing segment is not yet assigned. The SGCB at the end of the queue management structure of the free queue pointer is associated with 'NULL,' which is a value indicating the end.

(1-7) Configuration of the queue directory and segment management block

FIG. 9 shows a logical configuration diagram of a cache directory 131C and segment management block 131D.

The cache directory 131C is a hash table configured from a plurality of segment management block pointers (hereinafter referred to as 'SGCB pointers') 1310C and each of the SGCB pointers 1310C stores information pointing to a single segment management block 131D.

Note that the information stored in each of the SGCB pointers 1310C corresponds to the LBA (Logical Block Address) contained in the read/write request from the host system 2A. Therefore, one SGCB pointer 1310C can be detected based on the LBA and one SGCB can be detected based on the SGCB pointer 1310C.

More specifically, for example, upon receiving a read request from the host system 2A, the central processing unit 15 performs processing to read user data based on the read request, but in so doing must acquire information on the segment storing the user data, that is, the SGCB. In the processing to acquire the SGCB, the central processing unit 15 retrieves the SGCB pointer corresponding to the LBA based on the read position, that is, the LBA, of the user data contained in the read request, from the cache directory 131C. Furthermore, as a result of the retrieval, the central processing unit 15 is able to detect one SGCB pointer and acquire the SGCB by tracking the SGCB indicated by the detected SGCB pointer.

The segment management block 131D is configured from an SGCB pointer 1310D, a bidirectional queue pointer 1311D, a slot number 1312D, a segment attribute 1313D, a segment address 1314D, and a slot attribute 1315D.

The SGCB pointer 1310D stores, as shown in FIG. 8 above, a pointer which points to another segment management block 131D.

Furthermore, the bidirectional queue pointer 1311D stores, as shown in FIG. 8 above, a pointer which bidirectionally connects SGCBs and an SGCB and queue management information.

In addition, the slot number 1312D is position information for the logical volume storing the user data and stores an LBA, for example.

Further, the segment attribute 1313D stores information indicating which memory, of the cache memory 13 and local memory 16, the segment managed by the segment management block 131D belongs to.

Furthermore, the segment address 1314D stores positional information for a plurality of segments in the cache memory 13.

Moreover, the slot attribute 1315D stores information indicating any of the following: that the data stored in the segments managed by the segment management block 131D matches the data stored in the storage apparatus 3 (clean), is not yet stored in the storage apparatus 3 and is only stored in the cache memory 13 or local memory 16 (dirty), data is not yet stored in a segment managed by the segment management block 131D (free), or a segment managed by the segment management block 131D has not been assigned to any logical volume (free).

(1-8) Processing Routine for Various Processing (1-8-1) Read Processing

Figure 10:
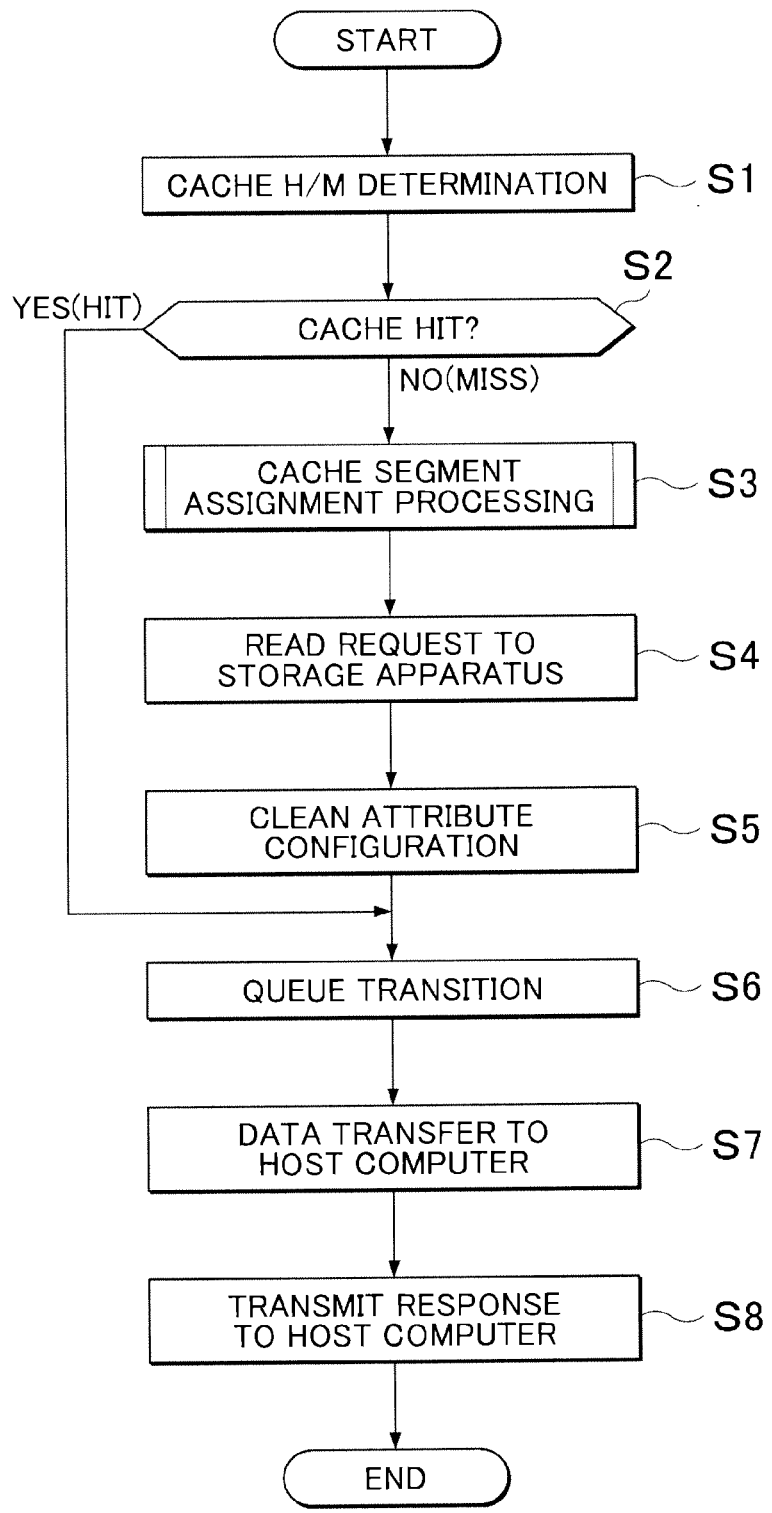
FIG. 10 is a flowchart showing a processing routine for read processing.

FIG. 10 shows a processing routine of read processing which is executed by the central processing unit 15. Upon receiving a read request from the host system 2A, the central processing unit 15 co-operates with the host I/O processing program 161A stored in the local memory 16 and starts the processing shown in FIG. 10.

First, the central processing unit 15 performs a cache H (Hit)/M (Miss) determination (S1). In the cache H/M determination, the central processing unit 15 performs processing to extract the LBA contained in the read request and retrieve the SGCB pointer corresponding to the LBA from the cache directory 131C. Further, if, as a result of this retrieval, one SGCB pointer has been detected from the cache directory 131C, the central processing unit 15 makes a 'cache HIT' determination, and if one such SGCB is not detected, makes a 'cache MISS' determination.

Thereafter, the central processing unit 15 determines whether or not a cache HIT determination has been obtained (S2). When a negative result is obtained in this determination, the central processing unit 15 performs processing to determine that a cache segment is not assigned to the LBA designated by the host system 2A and executes cache segment assignment processing (S3). The cache segment assignment processing will be described subsequently (see FIG. 12) and, in this processing, the central processing unit 15 performs processing to assign a cache segment from either of the cache memory 13 and the local memory 16.

Further, the central processing unit 15 makes a user data read request to the storage apparatus 3 in order to store user data in the segment assigned by the cache segment assignment processing (S4).

Subsequently, the central processing unit 15 stores the user data in the segment assigned by the cache segment assignment processing and configures the slot attribute 1315D of the segment management block 131D managing the segment as 'clean' (S5). The central processing unit 15 then subsequently moves to step S6.

However, upon obtaining an affirmative result in the determination of step S2, the central processing unit 15 performs queue transition processing (S6). In the queue transition processing, the central processing unit 15 inserts an SGCB which manages the segment where the read target data is stored between the clean queue MRU pointer and the SGCB related to the clean queue MRU pointer (see FIG. 6).

Furthermore, the central processing unit 15 transfers the user data stored in the cache segment to the host system 2A (S7) and transmits a response to report the fact that read processing is complete to the host system 2A (S8). The central processing unit 15 terminates the read processing as described earlier.

(1-8-2) Write Processing

Figure 11:
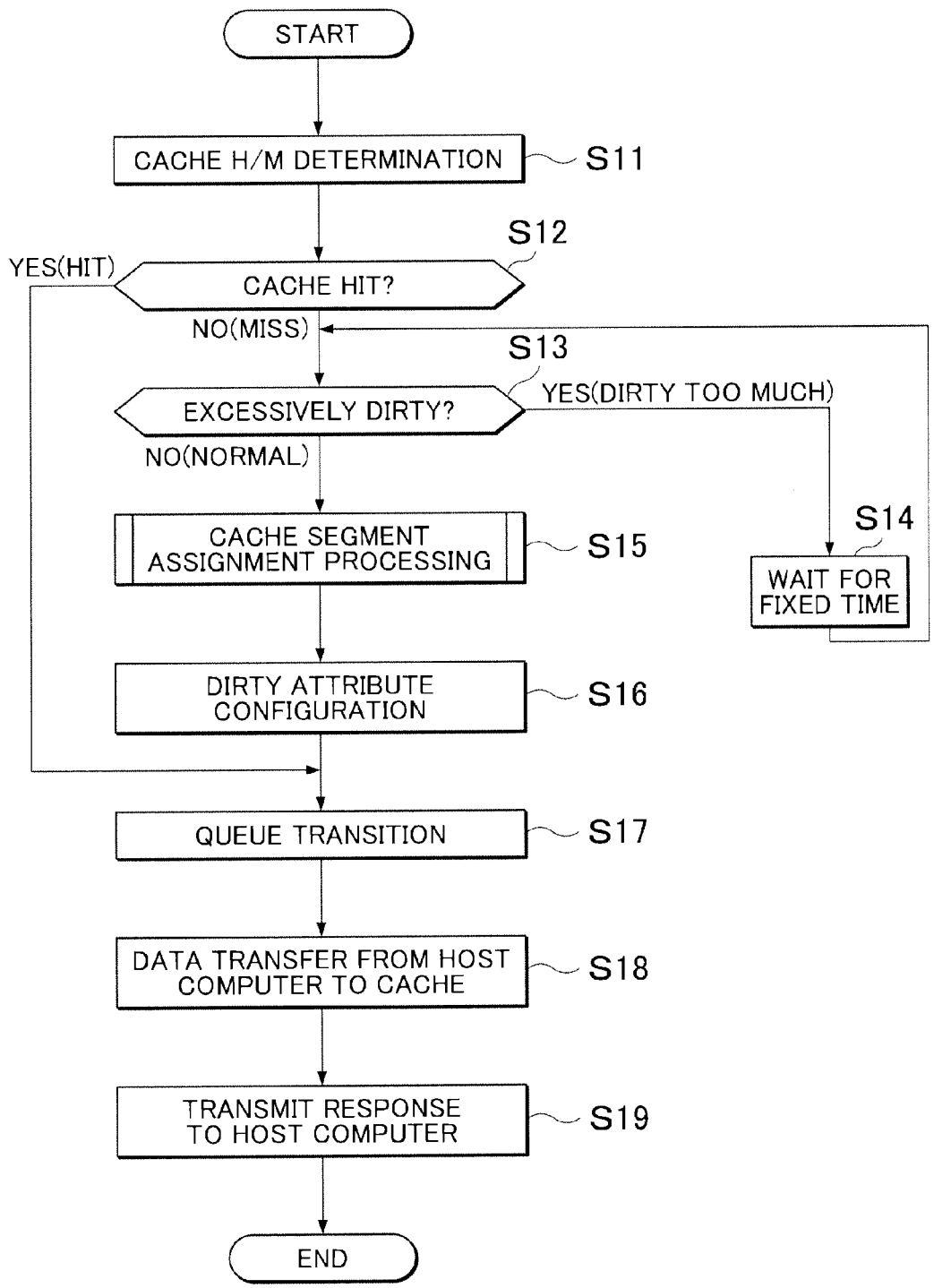
FIG. 11 is a flowchart showing a processing routine for write processing.

FIG. 11 shows a processing routine for write processing which is executed by the central processing unit 15. Upon receiving a write request from the host system 2A, the central processing, unit 15 co-operates with the host I/O processing program 161A stored in the local memory 16 and starts the processing shown in FIG. 11.

First, the central processing unit 15 makes a cache H/M determination (S11). In the cache H/M determination, in the same way as the determination in the foregoing read processing, the central processing unit 15 performs processing to extract the LBA included in the write processing and retrieve the SGCB pointer corresponding to the LBA from the cache directory 131C. The central processing unit 15 subsequently performs a 'cache HIT' or 'cache MISS' determination.

Subsequently, the central processing unit 15 determines whether or not the cache HIT determination is obtained (S12). When a negative result is obtained, the central processing unit 15 determines that a cache segment has not been assigned to the LBA designated by the host system 2A and performs cache segment assignment processing but first determines whether or not the data is excessively dirty (S13).

In the determination of whether or not the data is excessively dirty, the central processing unit 15 determines whether or not, among the data stored in the cache segment, dirty data exists in a certain amount or more. Upon obtaining an affirmative result in this determination, the central processing unit 15 does not, from the standpoint of reserving data reliability, execute the following processing unless dirty data is stored in the storage apparatus 3 and converted to clean data. Accordingly, the central processing unit 15 waits for the time interval required to convert the dirty data to clean data (S14). The central processing unit 15 then subsequently moves to step S15.

However, upon obtaining a negative result in the determination of step S13, the central processing unit 15 performs cache segment assignment processing (S15). The cache segment assignment processing will be described subsequently (see FIG. 12), but, in this processing, the central processing unit 15 executes processing to assign a cache segment from either the cache memory 13 or the local memory 16, and so on.

For a segment which is assigned by the cache segment assignment processing, the central processing unit 15 subsequently configures the slot attribute 1315D of the segment management block 131D, managing the segment, to 'dirty' (S16).

Thereafter, the central processing unit 15 performs queue transition processing (S17). In the queue transition processing, the central processing unit 15 inserts an SGCB for managing the segment storing the write target data between the dirty queue MRU pointer and the SGCB related to the dirty queue MRU pointer (see FIG. 7).

The central processing unit 15 then receives write target data from the host system 2A and stores the received write target data in the cache segment (S18) and transmits a response to report the fact that write processing is complete (S19). The central processing unit 15 terminates the write processing as described earlier.

(1-8-3) Cache Segment Assignment Processing

Figure 12:
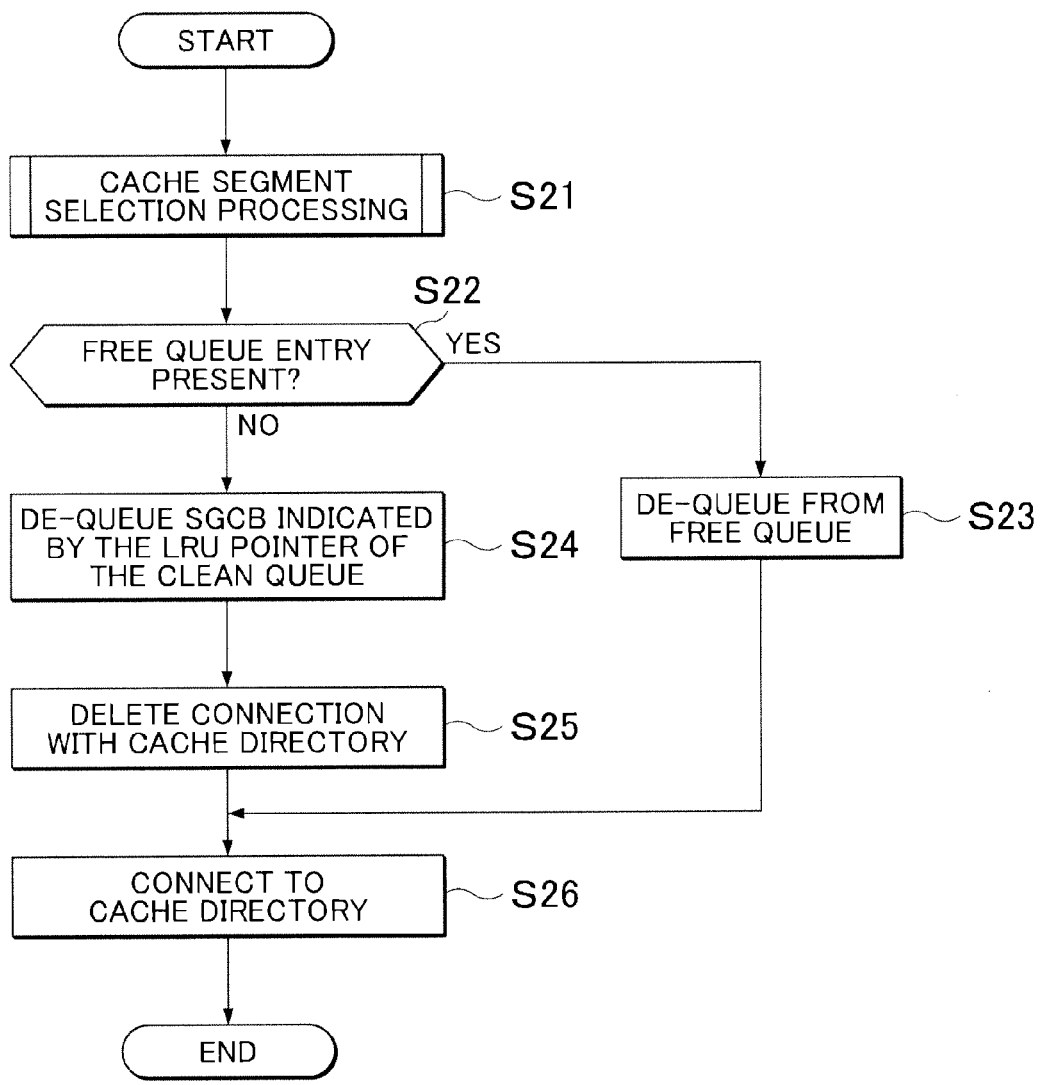
FIG. 12 is a flowchart shows a routine for cache segment assignment processing.

FIG. 12 shows a processing routine for cache segment assignment processing which is executed by the central processing unit 15. Upon receiving the read/write request from the host system 2A, the central processing unit 15 executes read/write processing as described earlier (see FIG. 10 and FIG. 11) and if, in so doing, an SGCB pointer corresponding to the read/write request cannot be detected from the cache directory 131C, the central processing unit 15 co-operates with the cache segment assignment processing program 161B stored in the local memory 16 and starts the cache segment assignment processing shown in FIG. 12.

First, the central processing unit 15 performs cache segment selection processing (S21). The details of the cache segment selection processing will be described subsequently (see FIG. 13), but, in this processing, the central processing unit 15 performs processing to assign a cache segment from either the cache memory 13 or the local memory 16.

Thereafter, the central processing unit 15 determines whether or not there is a free queue entry (S22). In other words, after selecting a memory (13 or 16) to act as cache-segment assignment source in step S21, the central processing unit 15 determines whether or not an unused segment in which user data can be stored exists in the selected memory.

Upon obtaining an affirmative result in this determination, the central processing unit 15 de-queues the SGCB indicated by the free queue (S23). Note that, in the foregoing read/write processing, user data is stored in the cache segment managed by the dequeued SGCB and various information (1310D to 1315D) of the SGCB is also updated.

However, upon obtaining a negative result in the determination of step S22, the central processing unit 15 de-queues the SGCB indicated by the clean queue LRU pointer (S24) and deletes the SGCB pointer indicating the de-queued SGCB from the entry of the cache directory 131C. That is, the central processing unit 15 deletes the connection between the de-queued SGCB and the cache directory 131C (S25).

Furthermore, the central processing unit 15 enters a new SGCB pointer, which indicates the de-queued SGCB, in the cache directory 131C. That is, the central processing unit 15 newly connects the de-queued SGCB to the cache directory (S26). As mentioned earlier, the central processing unit 15 terminates the cache segment assignment processing.

(1-8-4) Cache Segment Selection Processing

Figure 13:
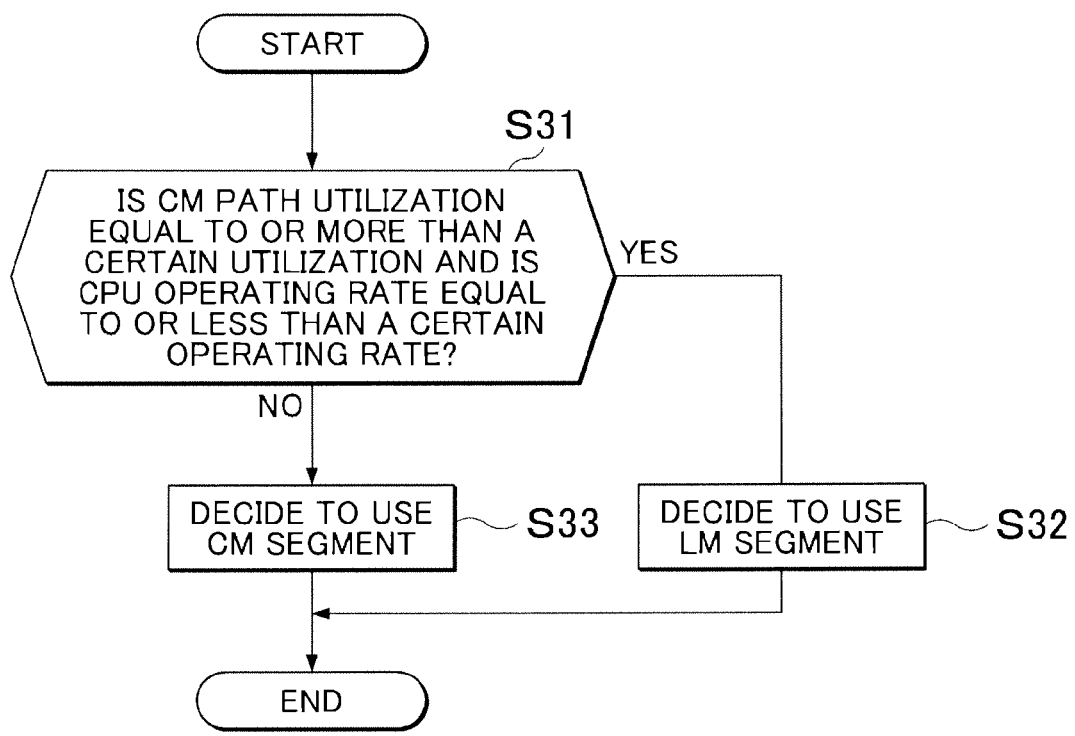
FIG. 13 is a flowchart showing a processing routine for cache segment selection processing.

FIG. 13 shows the processing routine for the cache segment selection processing which is executed by the central processing unit 15. Upon receiving the read/write request form the host system 2A, the central processing unit 15 executes read/write processing (see FIGS. 10 and 11) as described earlier, executes cache segment assignment processing (see FIG. 12) where necessary, and if the cache segment assignment processing is executed, the central processing unit 15 co-operates with the cache segment selection processing program 161C stored in the local memory 16 to start cache segment selection processing shown in FIG. 13.

First, the central processing unit 15 acquires the CPU operating rate and memory path utilization by co-operating with the CPU operating rate acquisition processing program 161D and memory path utilization acquisition processing program 161E which are stored in the local memory 16. Note that the method used to calculate the CPU operating rate and memory path utilization is as already described earlier in [Math 1] and [Math 2]. In addition, the memory path utilization calculated here denotes the utilization of the parallel bus connecting the data transfer control unit 14 and cache memory 13.

Furthermore, the central processing unit 15 determines whether the memory path utilization is equal to or more than a predetermined utilization and whether the CPU operating rate is equal to or less than a predetermined operating rate (S31).

Upon obtaining an affirmative result in this determination, the central processing unit 15 decides to assign a cache segment from the local memory 16 (S32).

However, upon obtaining a negative result in the determination of step S31, the central processing unit 15 decides to assign a cache segment from the cache memory 13 (S33).

As described earlier, the central processing unit 15 decides on either memory (13 or 16) for assignment of the cache segment and terminates the cache segment selection processing.

(1-9) User Data Flow (1-9-1) User Data Flow in Read Processing

Figure 14:
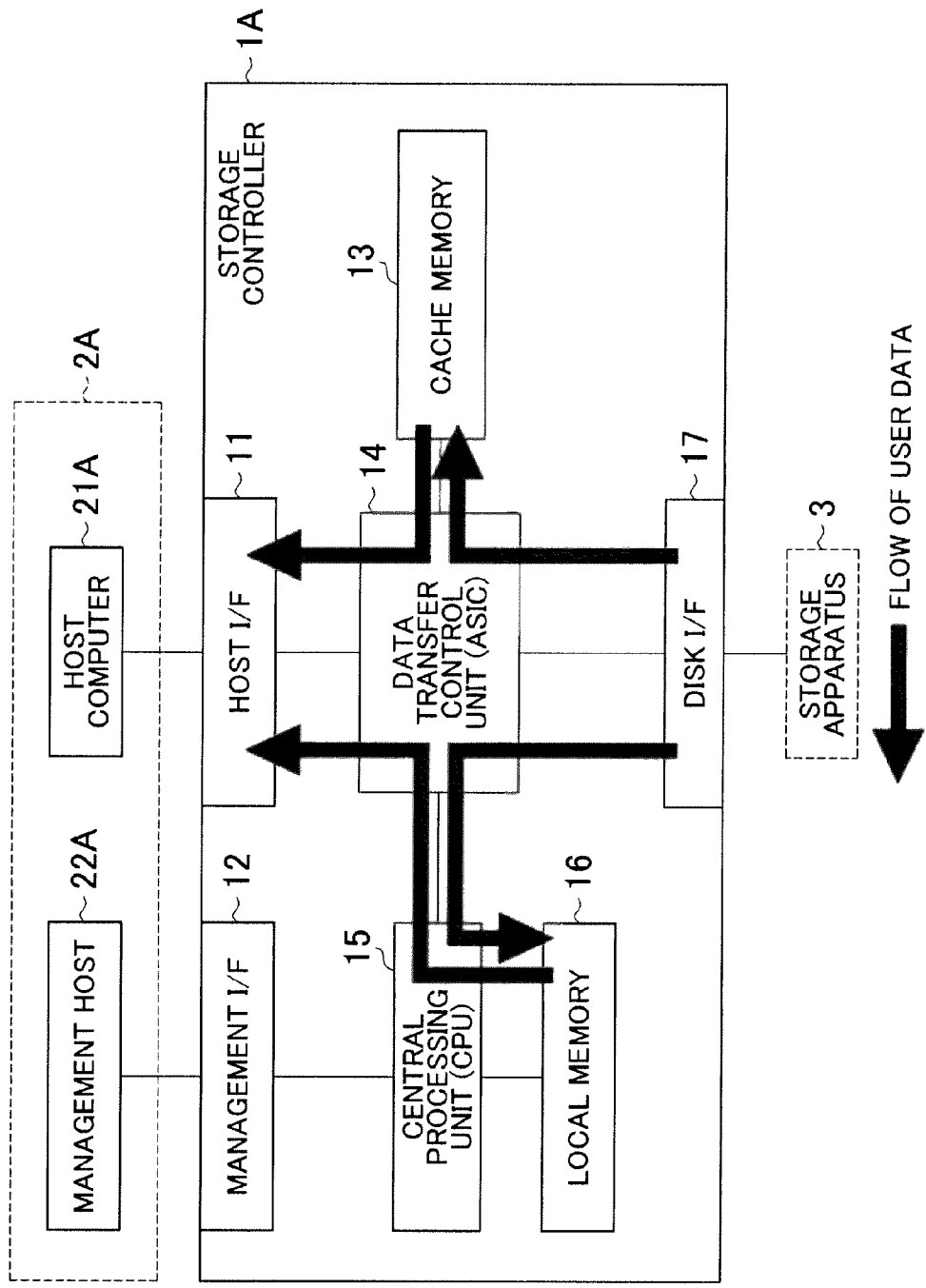
FIG. 14 is a conceptual view schematically showing the flow of user data during read processing.

FIG. 14 is a conceptual view schematically showing the flow of user data in read processing. According to FIG. 14, the user data stored in the storage apparatus 3 is stored in the cache memory 13 via the disk I/F 17 according to a read request from the host system 2A. Furthermore, according to this embodiment, the user data stored in the storage apparatus 3 may be stored in the local memory 16 via the disk I/F 17. As a result of the user data being stored in the local memory 16, the access latency in a case where the central processing unit 15 accesses the user data can be shortened.

Further, the user data stored in the cache memory 13 or local memory 16 is subsequently transferred to the host system 2A via the host I/F 11.

(1-9-2) User Data Flow in Write Processing

Figure 15:
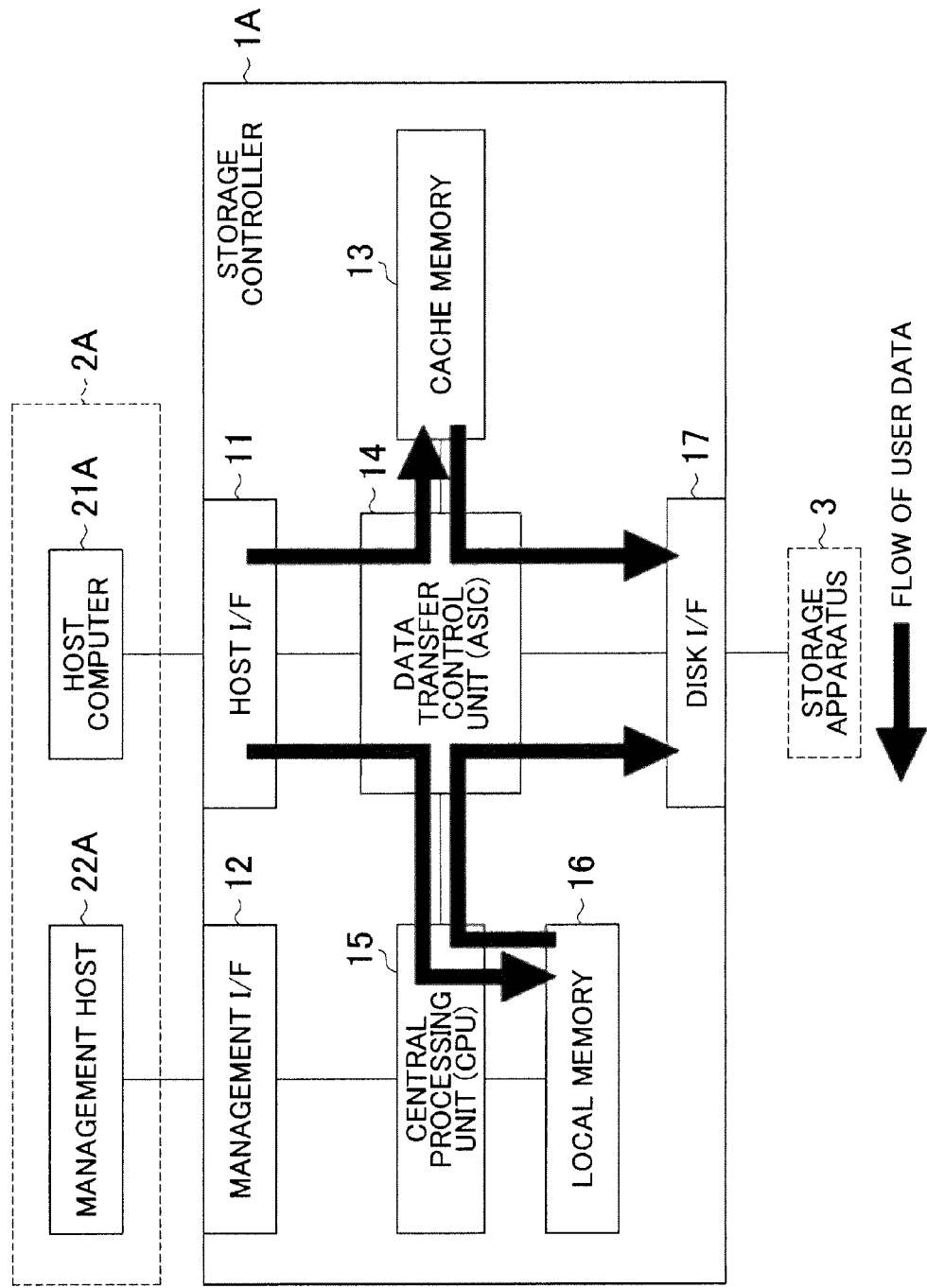
FIG. 15 is a conceptual view schematically showing the flow of user data during write processing.

FIG. 15 is a conceptual view schematically showing the flow of user data in write processing. According to FIG. 15, user data is stored in the data cache memory 13 via the host I/F 11 according to write requests from the host system 2A. Furthermore, according to this embodiment, the user data may be stored in the local memory 16 via the host I/F 11. As a result of the user data being stored in the local memory 16, the access latency in a case where the central processing unit 15 accesses metadata contained in the user data can be shortened.

In addition, the user data stored in the cache memory 13 or local memory 16 is subsequently transferred to the storage apparatus 3 via the disk I/F 17.

(1-10) Effect of First Embodiment

As mentioned earlier, according to this embodiment, only in cases where the memory path utilization of the parallel bus connecting the data transfer control unit 14 and cache memory 13 is equal to or more than a predetermined utilization and the operating rate of the central processing unit 15 is equal to or less than a predetermined operating rate, control is performed so that part of the storage area of the local memory 16 is used as cache memory. By performing control in this way, the memory bandwidth which can be utilized as cache memory increases and hence the throughput can be improved and an access path conflict in the access to the parallel bus connecting the central processing unit 15 and local memory 16 can be avoided. Note that the first embodiment is particularly effective during sequential access in which data of a large data length, for example, is subjected to read/write processing from the standpoint of avoiding conflict.

(2) Second Embodiment (2-1) Configuration of Storage Controller

In FIG. 1, 1B denotes the storage controller 1B according to the second embodiment overall. The second embodiment is configured in the same way as the storage controller 1A according to the first embodiment except for the fact that the storage controller 1B and the host computer 21B are large-scale general-purpose devices (mainframes) and that the storage controller 1B executes cache segment selection processing on the mainframe user data.

(2-2) Configuration of Configuration Information

FIG. 16 shows the device configuration table 1310E which is an example of the configuration information 131E among the various information (131A to 131E: see FIG. 4) stored in the control information area 131 of the cache memory 13.

Note that, according to this embodiment, by also storing this device configuration table 1310E in the control information area 162 of the local memory 16, the access latency expended when the central processing unit 15 refers to the device configuration table 1310E is shortened.

The device configuration table 1310E is a table which is prepared for each logical volume that the storage controller 1B provides to the host computer 21B and is a table for managing the mapping between the logical volume and host computer 21B.

Furthermore, the device configuration table 1310E is, as shown in FIG. 16, configured from a device field 1E, an access path field 2E, a connected host information field 3E, and a capacity field 4E.

The device field 1E stores an identifier for each logical volume which the storage controller 1B provides to the host computer 21B and the access path field 2E stores information indicating whether or not an access path is defined between each of the logical volumes and the host computer 21B.

In addition, the connected host information field 3E stores information indicating the type of the host computer 21B accessing each of the logical volumes. The information indicating the type of the host computer 21B is information which indicates the type of the operating system which runs on the host computer 21B, for example. Furthermore, the capacity field 4E stores information indicating the capacity of each logical volume.

Upon receiving the read/write request from the host computer 21B, which is a mainframe, the central processing unit 15 refers to the device configuration table 1310E and is thus able to determine whether or not the access target user data is mainframe data. For example, if a read request is received from the host computer 21B, the central processing unit 15 specifies an access target logical volume on the basis of the LBA contained in the read request. Furthermore, the central processing unit 15 is able to acquire information on the host computer 21B associated with the specified logical volume from the connected host information field 3E and is able to recognize that the access target user data is mainframe data.

(2-3) Mainframe Data Structure

FIG. 17 shows a mainframe data structure. In a mainframe, a variable-length recording format as shown in FIG. 17 is applied in the recording of data from the storage controller 1B to the storage apparatus 3. Further, the variable-length recording format track is configured from one home address 4 and a plurality of records 41. Note that the track is of a fixed length and the records are of variable length. Note also that the number of records contained in the track is variable.

The home address 4 is the first field located in the track header and the home address 4 stores information such as the track number. In addition, each record 41 is of a variable length and configured from count portions 410 and data portions 411.

The count portion 410 is a field of fixed length and the count portion 410 stores information such as the address of the record 41 and the length of the data portion 411. In other words, the data stored in the count portion 410 is data which is related to the data stored in the data portion 411 and is typically called 'metadata.'

The metadata includes, as the address of the record 41, for example, a cylinder number, a header number, or a record number, and the number is indicated by a set of sequential numbers assigned from the track header.

In addition, the data portion 411 stores user data and the length of the record 41 is determined by the length of the user data.

When issuing a user data read/write request, the host computer 21B which is a mainframe issues a read/write request to the storage controller 1B not by designating the address of the data portion 411 but rather by designating the track number and record number. Hence, in cases where the storage controller 1B accesses user data which is a read/write request target, the storage controller 1B reads the count portions 410 in order starting with the home address 4 in order to specify the start addresses of the data portions 411. In other words, in cases where a read/write request from the mainframe is received, the central processing unit 15 of the storage controller 1B reads the metadata of the count portions 410 and accesses the user data of the data portions 411.

(2-4) Cache Segment Selection Processing

Figure 18:
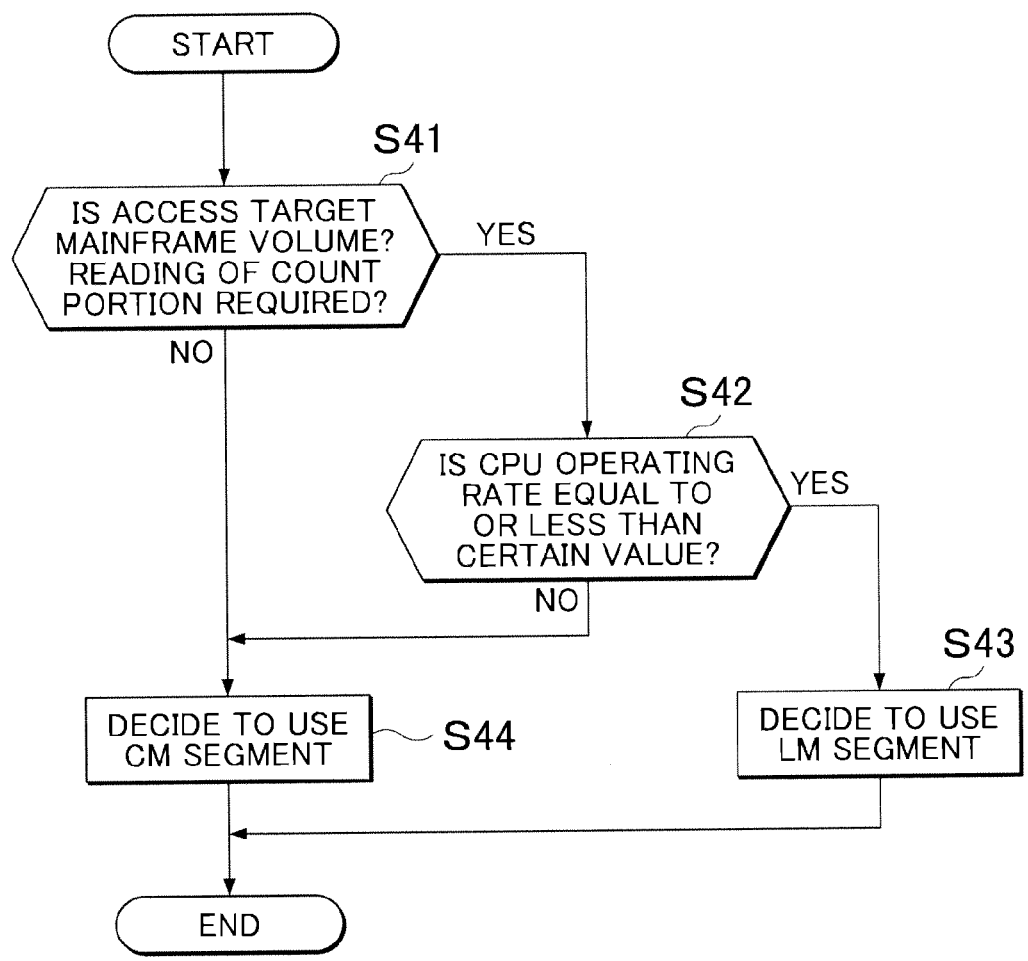
FIG. 18 is a flowchart showing a routine for cache segment assignment processing.

FIG. 18 shows a processing routine for cache segment selection processing which is executed by the central processing unit 15. Upon receiving a read/write request from a host system 2B, the central processing unit 15 executes read/write processing which is explained in the first embodiment (see FIGS. 10 and 11) and executes cache segment assignment processing if necessary (see FIG. 12) and, in cases where cache segment assignment processing is executed, the central processing unit 15 co-operates with the cache segment selection processing program 161C stored in the local memory 16 and starts the cache segment selection processing shown in FIG. 18.

First, the central processing unit 15 refers to the device configuration management table 1310E which is stored in the control information area 162 of the local memory 16 and determines whether or not the user data which is to serve as the read/write request target is main frame data and if it is necessary to access the metadata (more specifically, the count portion 410) contained in the user data during read/write processing (S41).

Upon obtaining an affirmative result in this determination, the central processing unit 15 determines whether or not the CPU operating rate is equal to or less than a predetermined operating rate (S42).

Furthermore, upon obtaining an affirmative result in this determination, the central processing unit 15 determines that the user data serving as the read/write request target is mainframe data and that the throughput is not reduced even when the main frame data is stored in the local memory 16 and decides to assign a cache segment from the local memory 16 in order to store the user data in the local memory 16 (S43).

However, upon obtaining a negative result in the determination of step S41 or S42, the central processing unit 15 determines that regardless of whether the user data serving as the read/write request target is mainframe data or is not mainframe data, the throughput is reduced when the user data is stored in the local memory 16 and decides to assign a cache segment from the cache memory 13 in order to store the user data in the cache memory 13 (S44).

As described hereinabove, the central processing unit 15 decides on either memory (13 or 16) for the assignment of the cache segment and terminates the cache segment selection processing.

(2-5) User Data and Control Information Flow

Figure 19:
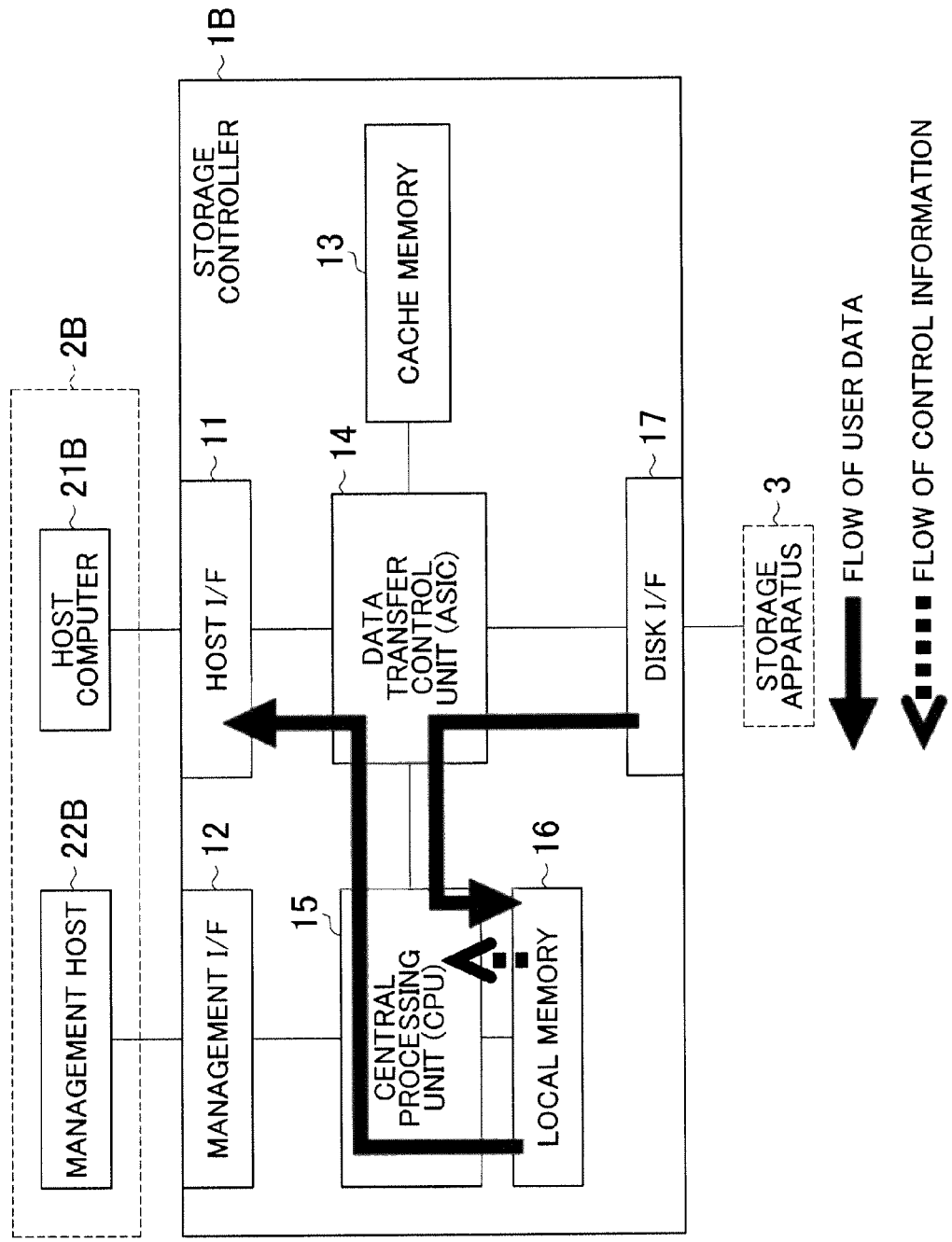
FIG. 19 is a conceptual view which schematically shows the flow of user data and control information during read processing.

FIG. 19 is a conceptual view which schematically shows the flow of user data and control information in the read processing. Note that, here, the data is mainframe data and that the flow of user data including metadata is explained. According to FIG. 19, user data containing the metadata stored in the storage apparatus 3 is stored in the local memory 16 via the disk I/F 17 according to the read request from the host system 2B. As a result of user data being stored in the local memory 16, the access latency in a case where the central processing unit 15 accesses the metadata contained in the user data, that is, the control information can be shortened.

Furthermore, the user data which is stored in the local memory 16 is subsequently transferred to the host system 2B via the host I/F 11. In addition, the control information contained in the metadata is transferred to the central processing unit 15.

Note that the flow of user data in the write processing is the same as the flow shown in FIG. 15 described in the first embodiment, and therefore will not be described here.

(2-6) Effect of the Second Embodiment

As mentioned earlier, according to this embodiment, control is performed so that part of the storage area of the local memory 16 is used as cache memory only when the user data which is a read request target is mainframe data and the throughput is not reduced even when the mainframe data is stored in the local memory 16. Since the memory bandwidth which can be utilized as cache memory increases as a result of this control, the throughput can be improved and the access latency when the central processing unit 15 accesses the metadata to read the control information can be shortened. Note that, according to the second embodiment, because user data which includes metadata is stored in the cache segment of the local memory 16, the number of times the local memory 16 is accessed increases, however, since this control is performed only when the CPU operating rate is no more than a fixed value, the throughput is not reduced.

(3) Third Embodiment (3-1) Configuration of Storage Controller

In FIG. 1, 1C refers to a storage controller 1C according to the third embodiment overall. The third embodiment is configured in the same way as the storage controller 1A according to the first embodiment except for the fact that the storage controller IC performs hierarchical control (VMA: Virtual Memory Access) in which control information (see FIGS. 3 and 4) is mainly stored in the storage apparatus 3 and not in the cache memory 13 or local memory 16.

(3-2) Cache Segment Selection Processing

Figure 20:
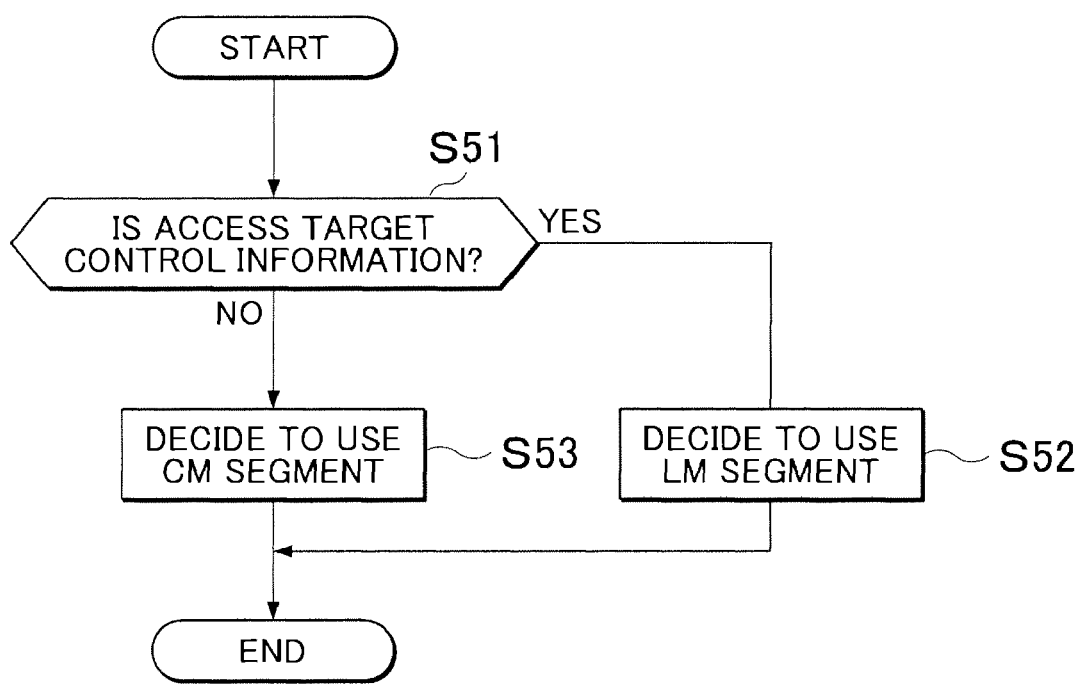
FIG. 20 is a flowchart showing a processing routine for cache segment selection processing.

FIG. 20 shows a processing routine for cache segment selection processing which is executed by the central processing unit 15. Upon receiving the control information read/write request from a host system 2C, the central processing unit 15 executes read/write processing which is explained in the first embodiment (see FIGS. 10 and 11) and executes cache segment assignment processing if necessary (see FIG. 12) and, if this cache segment assignment processing is executed, the central processing unit 15 co-operates with the cache segment selection processing program 161C stored in the local memory 16 and thus starts the cache segment selection processing shown in FIG. 20.

First, the central processing unit 15 determines whether or not the read/write request target is control information (S51).

Upon obtaining an affirmative result in this determination, the central processing unit 15 determines that the read/write request target is control information and thus decides to assign a cache segment from the local memory 16 in order to store the control information in the local memory 16 (S52).

Note that, in conventional hierarchical control, the central processing unit 15 does not write the control information in the local memory 16 and, after writing the control information in the cache memory 13, stores the control information in the storage apparatus 3. However, according to this embodiment, the central processing unit 15 assigns a cache segment from the local memory 16 as mentioned earlier and stores the control information in the storage apparatus 3 after writing the control information to the local memory 16.

However, upon obtaining a negative result in the determination of step S51, the central processing unit 15 determines that the read/write request target is not control information and thus decides to assign a cache segment from the cache memory 13 in order to store data other than the control information in the cache memory 13 (S53).

As described hereinabove, the central processing unit 15 decides on either memory (13 or 16) for assignment of the cache segment and terminates the cache segment selection processing.

(3-3) Second Cache Segment Selection Processing

Figure 21:
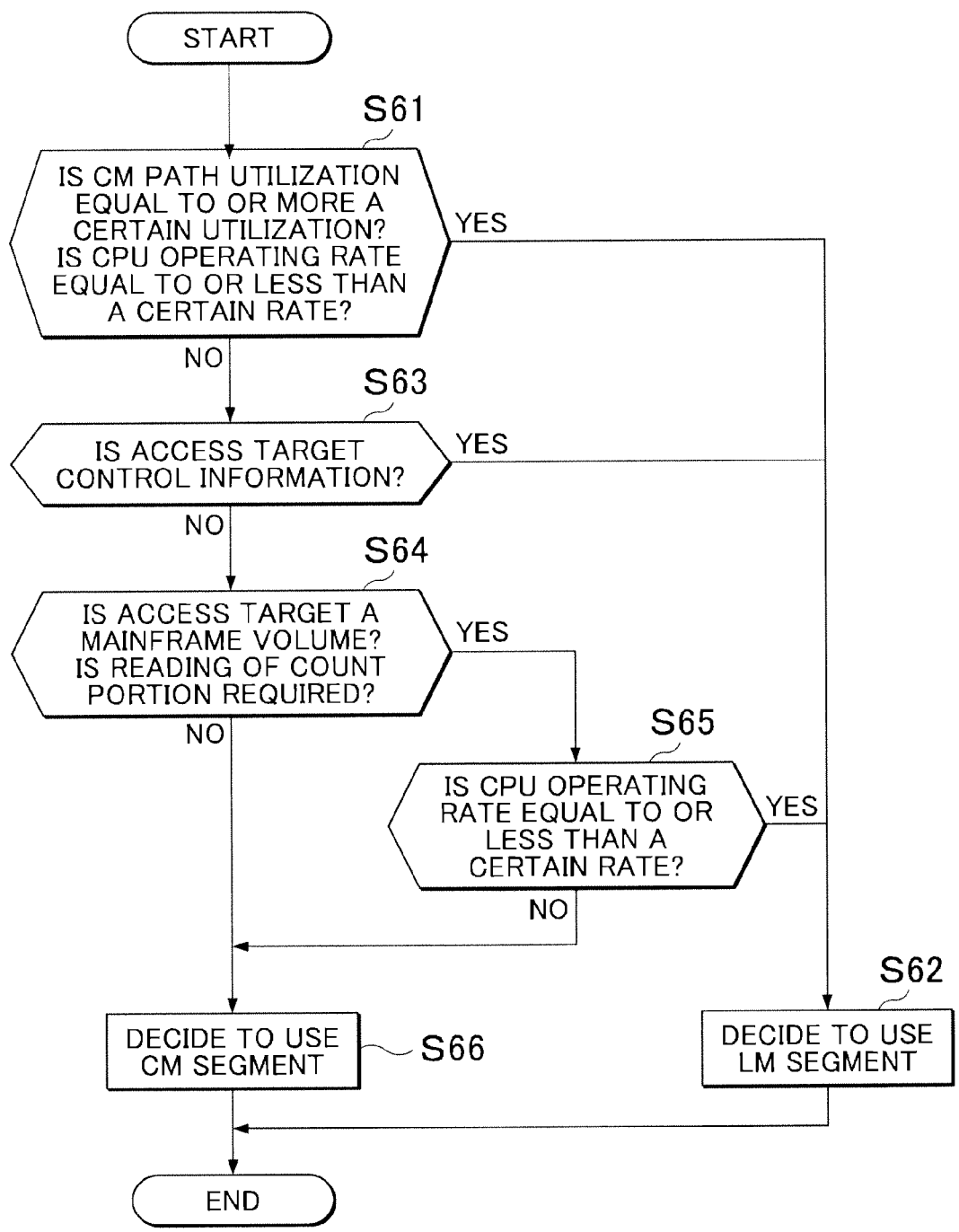
FIG. 21 is a flowchart showing a processing routine for cache segment selection processing.

FIG. 21 shows a processing routine for second cache segment selection processing which is executed by the central processing unit 15. Upon receiving a read/write request for either control information or user data from the host system 2B, the central processing unit 15 executes the read/write request described in the first embodiment (see FIGS. 10 and 11) and executes cache segment assignment processing if necessary (see FIG. 12) and, if the cache segment assignment processing is executed, the central processing unit 15 cooperates with the cache segment selection processing program 161C stored in the local memory 16 to start second cache segment selection processing, which is shown in FIG. 21.

Note that the second cache segment selection processing shown in FIG. 21 is processing which combines the cache segment selection processing (see FIGS. 13 and 18) described in the first and second embodiments and the foregoing cache segment selection processing (FIG. 20).

First, the central processing unit 15 acquires the CPU operating rate and the memory path utilization and determines whether or not the acquired memory path utilization is equal to or more than a predetermined utilization and the CPU operating rate is equal to or less than a predetermined operating rate (S61).

Upon obtaining an affirmative result in this determination, the central processing unit 15 decides to assign a cache segment from the local memory 16 (S62).

However, upon obtaining a negative result in the determination of step S61, the central processing unit 15 determines whether or not the read/write request target is control information (S63).

Upon obtaining an affirmative result in the determination, the central processing unit 15 moves to the aforementioned step S62 and decides to assign a cache segment from the local memory 16 (S62).

However, upon obtaining a negative result in the determination of step S63, the central processing unit 15 refers to the device configuration table 1310E and determines whether or not the user data serving as the read/write request target is mainframe data and whether or not it is necessary to access the metadata contained in the user data during the read/write processing (S64).

Upon obtaining an affirmative result in this determination, the central processing unit 15 determines whether or not the CPU operating rate is equal to or less than a predetermined operating rate (S65).

Upon obtaining an affirmative result in this determination, the central processing unit 15 moves to the aforementioned step S62 and decides to assign a cache segment from the local memory 16 (S62).

However, upon obtaining a negative result in the determination of step S65, the central processing unit 15 decides to assign a cache segment from the cache memory 13 (S66).

As described earlier, the central processing unit 15 decides on either memory (13 or 16) for assignment of the cache segment and terminates the cache segment selection processing.

(3-3) Control Information Flow

Figure 22:
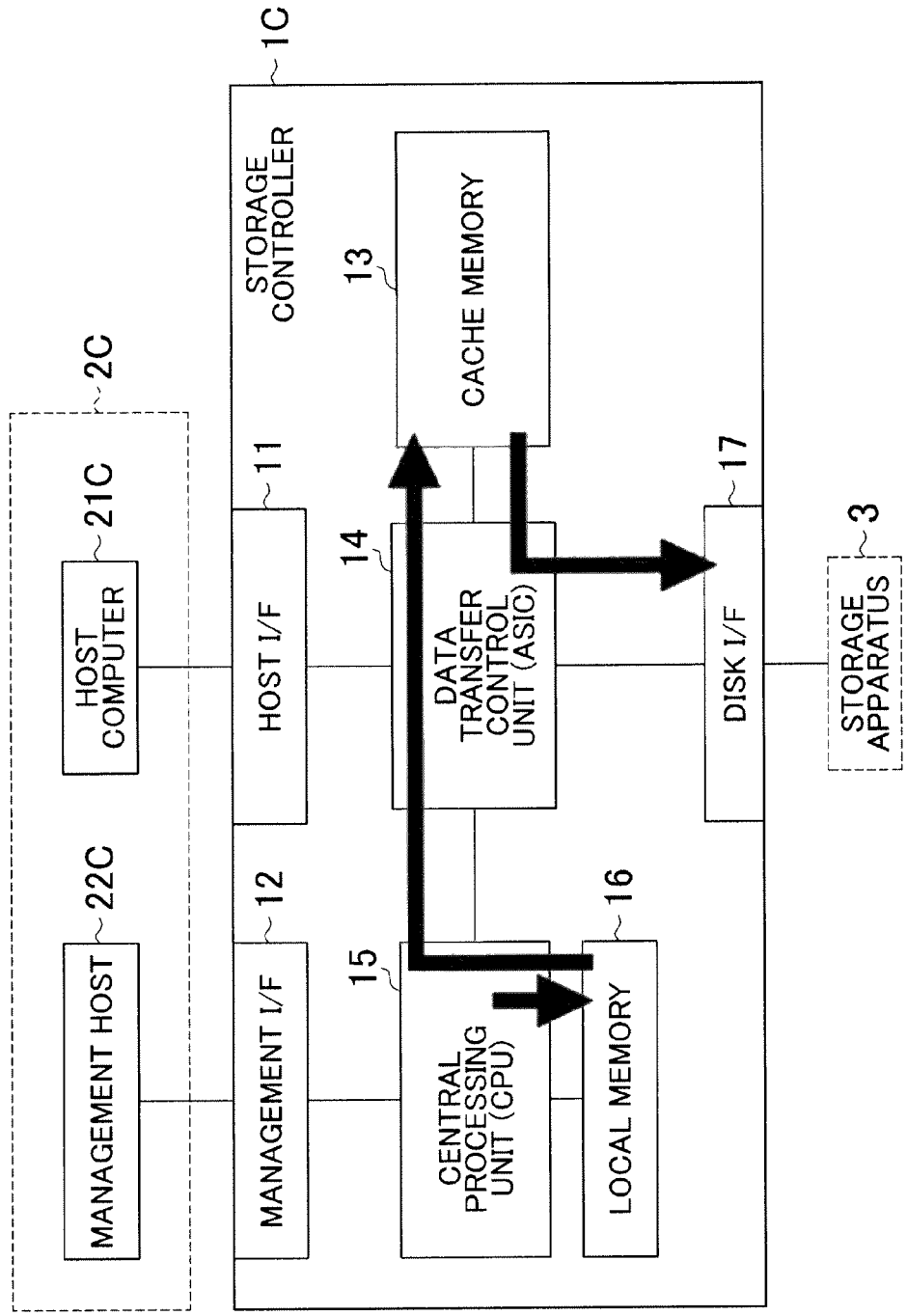
FIG. 22 is a conceptual view which schematically shows the flow of control information during write processing.

FIG. 22 is a conceptual view which schematically shows the flow of control information in write processing. According to FIG. 22, the control information created by the central processing unit 15 is stored in the local memory 16 and from the perspective of ensuring reliability, also stored in the cache memory 13. Conventionally, the control information is not stored in the local memory 16 but stored by being written to the cache memory 13 twice, however, according to this embodiment, the control information is stored in the local memory 16 and cache memory 13 as mentioned earlier.

Furthermore, the control information stored in the cache memory 13 is subsequently transferred to the storage apparatus 3 via a disk I/F.

Note that the flow of the control information in the read processing is transferred to the central processing unit 15 from the local memory 16 in the same way as the flow shown in FIG. 19 which is explained in the second embodiment.

(3-4) Effect of the Third Embodiment

As described earlier, according to this embodiment, if hierarchical control is performed in which the storage controller 1C stores control information in the storage apparatus 3, control is exercised for the control information so that part of the storage area of the local memory 16 is used the cache memory. As a result of performing control in this way, the memory bandwidth that can be used as cache memory increases, and hence the throughput can be improved, and because the control information is stored in the local memory 16 close to the central processing unit 15, the access latency when the central processing unit 15 reads the control information can be shortened. Note that, according to the third embodiment, the control information is stored in the local memory 16 and cache memory 13 respectively and hence there is no need for the conventional processing in which the control information is written twice to the cache memory 13 and therefore the load on the memory bandwidth in the cache memory 13 can be shortened.

(4) Further Embodiments

Note that, according to the foregoing first to third embodiments, as a control unit which is connected to the data transfer control unit via the serial bus and which instructs the data transfer control unit to perform a control operation for transfer control, the central processing unit 15 may include a function for performing centralized control of the operation of the storage controllers 1A to 1C and may be a control unit with CPU functions or a microprocessor (MPU: Micro-Processing Unit) which integrates the functions of a CPU on a single chip, for example. Furthermore, the data transfer control unit 14 may be an LSI or ASIC or the like, as described earlier.

In addition, in FIG. 1, at least one of the host computers 21A to 21C may be connected to a network N, for example, an open-system host computer and a mainframe host computer may be connected in a plurality via a network N. Furthermore, the storage controllers 1A to 1C may receive read/write requests from each of the host computers.

INDUSTRIAL APPLICABILITY

The present invention can be widely applied to a storage controller comprising memory of two types with different characteristics such as cache memory and local memory, and to a method of controlling same.

REFERENCE SIGNS LIST 1A to 1C Storage controller
11 Host I/F
12 Management I/F
13 Cache memory
14 Data transfer control unit
15 Central processing unit
16 Local memory
17 Dirty I/F
2A to 2C Host system
3 Storage apparatus

The invention claimed is:

1. A storage controller which exercises control of data between a host system and a storage apparatus, comprising:
   a data transfer control unit which exercises control to transfer the data on the basis of a read/write request from the host system;
   a cache memory which is connected to the data transfer control unit via a first parallel bus and which stores the data transferred from the data transfer control unit;
   a control unit which is connected to the data transfer control unit via a serial bus and which instructs the data transfer control unit to perform a transfer control operation; and
   a local memory which is connected to the control unit via a second parallel bus and which stores the data transferred from the data transfer control unit via the control unit,
   wherein the control unit executes cache segment selection processing in which the control unit decides to assign, from a cache segment of either the cache memory or the local memory, a storage area which stores the data on the basis of an operating rate of the control unit and a path utilization of the first parallel bus.

2. The storage controller according to claim 1,
   wherein the control unit decides to assign, from the cache segment of the local memory, a storage area storing the data in the cache segment selection processing in cases where the operating rate of the control unit is equal to or less than a predetermined operating rate and the path utilization of the first parallel bus is equal to or more than a predetermined utilization.

3. The storage controller according to claim 1,
   wherein the local memory stores a device configuration management table which indicates whether or not the data is mainframe data, and
   wherein the control unit executes the cache segment selection processing on the basis of the device configuration management table and the operating rate of the control unit.

4. The storage controller according to claim 3,
   wherein the control unit refers to the device configuration management table and, if the data is mainframe data and data which includes metadata, and if the operating rate of the control unit is equal to or less than a predetermined operating rate, the control unit decides to assign, from the cache segment of the local memory, a storage area for storing the data in the cache segment selection processing.

5. The storage controller according to claim 1,
   wherein, if the data is control information which is used to control the operation in the storage controller through co-operation with the control unit, the control unit decides to assign, from the cache segment of the local memory, storage areas storing the data, in the cache segment selection processing.

6. A method of controlling a storage controller which exercises control of data between a host system and a storage apparatus, the storage controller comprising a data transfer control unit which exercises control to transfer the data on the basis of a read/write request from the host system; a cache memory which is connected to the data transfer control unit via a first parallel bus and which stores the data transferred from the data transfer control unit; a control unit which is connected to the data transfer control unit via a serial bus and which instructs the data transfer control unit to perform a transfer control operation; and a local memory which is connected to the control unit via a second parallel bus and which stores the data transferred from the data transfer control unit via the control unit, the method comprising:
   a first step in which the control unit executes cache segment selection processing in which the control unit decides to assign, from a cache segment of either the cache memory or the local memory, a storage area which stores the data on the basis of an operating rate of the control unit and a path utilization of the first parallel bus; and
   a second step in which the control unit stores the data in the cache segment determined in the first step.

7. The method of controlling a storage controller according to claim 6,
   wherein, in the first step, the control unit decides to assign, from the cache segment of the local memory, a storage area storing the data in the cache segment selection processing in cases where the operating rate of the control unit is equal to or less than a predetermined operating rate and the path utilization of the first parallel bus is equal to or more than a predetermined utilization.

8. The method of controlling a storage controller according to claim 6,
   wherein the local memory stores a device configuration management table which indicates whether or not the data is mainframe data, and wherein, in the first step,
   the control unit executes the cache segment selection processing on the basis of the device configuration management table and the operating rate of the control unit.

9. The method of controlling a storage controller according to claim 8,
   wherein, in the first step, the control unit refers to the device configuration management table and, if the data is mainframe data and data which includes metadata, and if the operating rate of the control unit is equal to or less than a predetermined operating rate, the control unit decides to assign, from the cache segment of the local memory, a storage area for storing the data in the cache segment selection processing.

10. The method of controlling a storage controller according to claim 6,
    wherein, in the first step, if the data is control information which is used to control the operation in the storage controller through co-operation with the control unit, the control unit decides to assign, from the cache segment of the local memory, storage areas storing the data, in the cache segment selection processing.

* * * * *